(12) United States Patent
Hashimoto et al.

(10) Patent No.: US 11,326,541 B2
(45) Date of Patent: May 10, 2022

(54) VEHICLE LEARNING CONTROL SYSTEM, VEHICLE CONTROL DEVICE, AND VEHICLE LEARNING DEVICE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 16/987,742

(22) Filed: Aug. 7, 2020

(65) Prior Publication Data

US 2021/0054800 A1    Feb. 25, 2021

(30) Foreign Application Priority Data

Aug. 22, 2019   (JP) .............................. JP2019-152134

(51) Int. Cl.
    *F02D 41/26*    (2006.01)
    *F02D 41/22*    (2006.01)
    *F02D 41/00*    (2006.01)

(52) U.S. Cl.
    CPC ........... *F02D 41/26* (2013.01); *F02D 41/009* (2013.01); *F02D 41/22* (2013.01)

(58) Field of Classification Search
    CPC .. F02D 41/1401; F02D 41/1405; F02D 41/26; F02D 41/009; F02D 41/22;
    (Continued)

(56) References Cited

U.S. PATENT DOCUMENTS

2004/0044461 A1* 3/2004 Ueda ................... F02D 41/1498
                                                 701/111
2009/0265083 A1* 10/2009 Kajiwara .............. F01L 1/3442
                                                 701/105

(Continued)

FOREIGN PATENT DOCUMENTS

JP    4-51354 A    2/1992
JP    4-91348 A    3/1992

(Continued)

OTHER PUBLICATIONS

Brad Templeton, "Tesla's "Shadow" Testing Offers a Useful Advantage on the Biggest Problem in Robocars," Retrieved from the Internet [URL: https://www.forbes.com/sites/bradtempleton/2019/04/29/teslas-shadow-testing-offers-a-useful-advantage-on-the-biggest-problem-in-robocars/?sh=51c4bf63c06c], Apr. 29, 2019, 7 pages.

(Continued)

*Primary Examiner* — George C Jin
(74) *Attorney, Agent, or Firm* — Oblon, McClelland, Maier & Neustadt, L.L.P.

(57) ABSTRACT

A vehicle control device includes a storage device that stores mapping data including data that defines mapping that receives input data based on a plurality of detection values which are detection values of an in-vehicle sensor and which are before or after in time series and outputs a predetermined output value and that is learned by machine learning and an execution device that executes an acquisition process of acquiring the input data from the storage device, a calculation process of calculating the predetermined output value with the input data as an input of the mapping, and a transmission process of transmitting the detection values used when the input data is generated and time series data including data based on one or a plurality of detection values (Continued)

which are before or after the detection value used for the input data in time series to an outside of the vehicle.

20 Claims, 9 Drawing Sheets

(58) Field of Classification Search
CPC .... F02D 41/266; F02D 41/1497; F02D 41/28; F02D 2200/101; F02D 2200/1015; F02D 29/02; G06N 3/0081; G06N 20/10; G06N 3/08; G01M 15/11
See application file for complete search history.

(56) References Cited

U.S. PATENT DOCUMENTS

| | | | | |
|---|---|---|---|---|
| 2010/0168989 | A1* | 7/2010 | Gao | F02D 41/2429 701/110 |
| 2014/0352414 | A1* | 12/2014 | Ito | G01M 15/11 73/114.11 |
| 2016/0025028 | A1* | 1/2016 | Vaughan | F02D 41/263 701/105 |
| 2019/0264624 | A1* | 8/2019 | Hagari | F02D 41/005 |
| 2019/0340448 | A1 | 11/2019 | Hayashi et al. | |
| 2020/0026268 | A1 | 1/2020 | Matsubara et al. | |

FOREIGN PATENT DOCUMENTS

| | | |
|---|---|---|
| JP | 2009-250693 A | 10/2009 |
| JP | 2012-48310 A | 3/2012 |
| JP | 2015-194355 A | 11/2015 |
| JP | WO 2017/081984 A1 | 5/2017 |
| JP | 2018-120291 A | 8/2018 |
| JP | 2019-32725 A | 2/2019 |
| JP | 2019-76819 A | 5/2019 |
| JP | 2019-81531 A | 5/2019 |
| JP | 2019-95217 A | 6/2019 |
| JP | 6547991 B1 | 7/2019 |
| JP | 6593560 B1 | 10/2019 |
| WO | WO 2009/122249 A1 | 10/2009 |
| WO | WO 2019/135274 A1 | 7/2019 |

OTHER PUBLICATIONS

Tamer Salama, "Tesla's neural network software," Retrieved from the Internet [URL: https://www.linkedin.com/pulse/teslas-neural-network-software-tamer-salama], Apr. 29, 2019, 5 pages.

* cited by examiner

FIG. 9
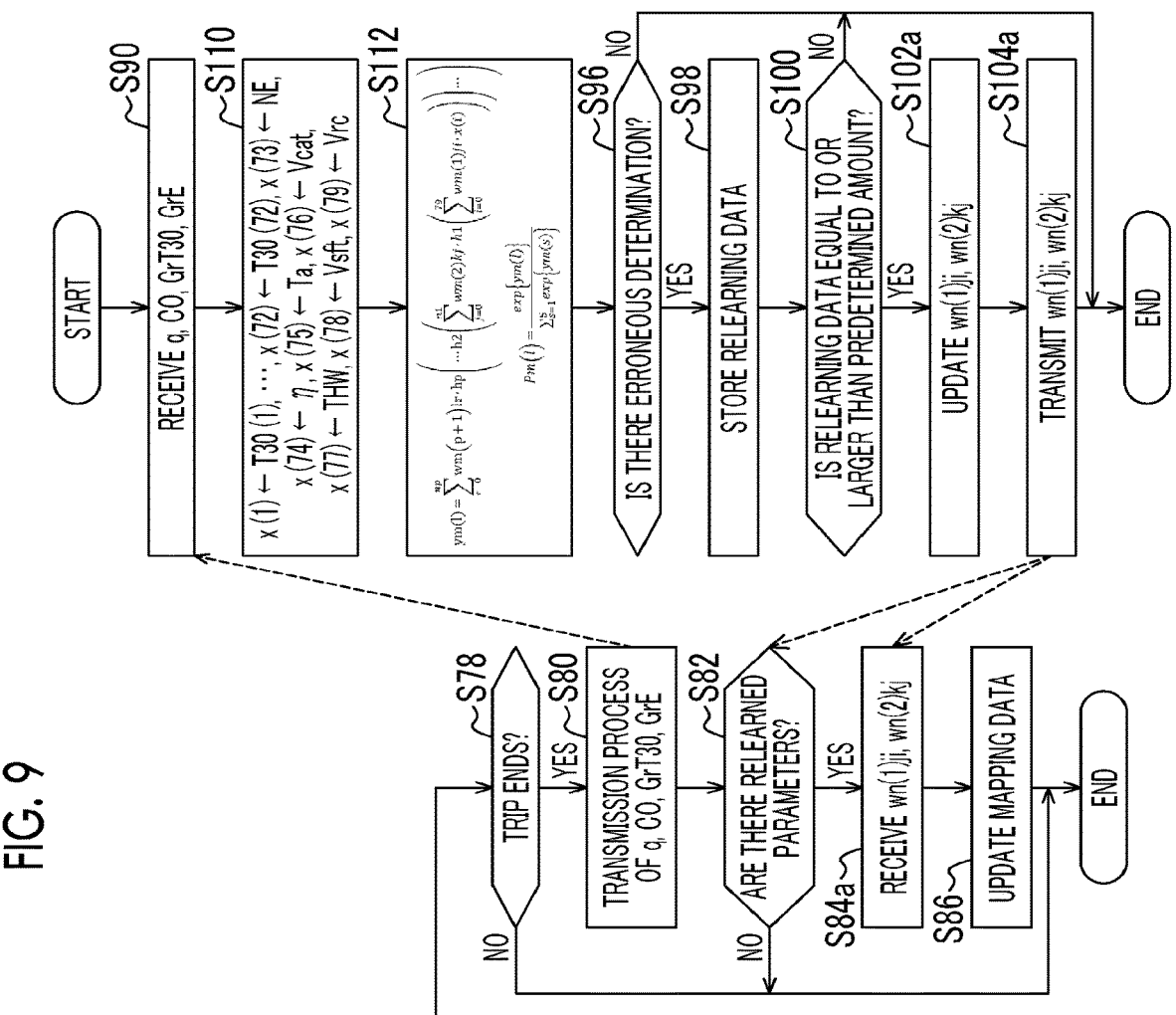
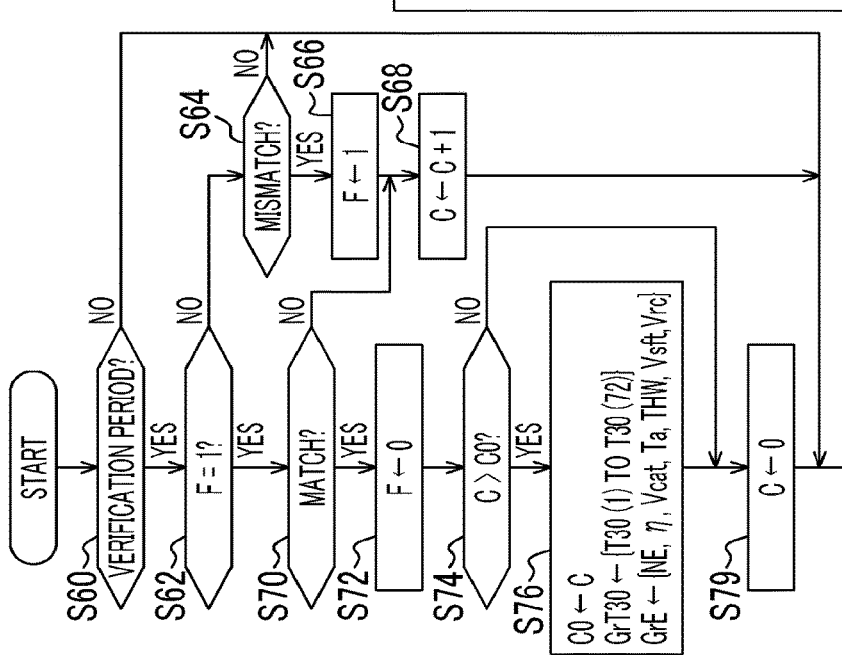

VEHICLE LEARNING CONTROL SYSTEM, VEHICLE CONTROL DEVICE, AND VEHICLE LEARNING DEVICE

INCORPORATION BY REFERENCE

The disclosure of Japanese Patent Application No. 2019-152134 filed on Aug. 22, 2019 including the specification, drawings and abstract is incorporated herein by reference in its entirety.

BACKGROUND

1. Technical Field

The present disclosure relates to a vehicle learning control system, a vehicle control device, and a vehicle learning device using machine learning.

2. Description of Related Art

For example, Japanese Unexamined Patent Application Publication No. 4-91348 (JP 4-91348 A) discloses a device provided with a neural network that receives a rotation fluctuation amount which is a change amount of rotation speed and outputs a value indicating whether a misfire occurs in each of a plurality of cylinders of an internal combustion engine.

SUMMARY

By the way, learning using training data in various situations is generally needed in order to enhance the reliability of a learned model learned by machine learning. However, before the neural network is mounted on a vehicle, sufficient training data may not always be obtained in various situations that may occur when the neural network is actually mounted on the vehicle. When the sufficient training data cannot be obtained, it is difficult to verify whether the neural network outputs a correct value in various situations when the neural network is mounted on the vehicle.

The present disclosure provides a vehicle learning control system, a vehicle control device, and a vehicle learning device for solving the above problems.

A first aspect of the present disclosure relates to a vehicle control device including a storage device and an execution device. The storage device stores mapping data including data that defines mapping that receives input data based on a plurality of detection values which are detection values of an in-vehicle sensor and which are before or after in time series and outputs a predetermined output value having information on a default state of a vehicle and that is learned by machine learning. The execution device executes an acquisition process of acquiring the input data from the storage device, a calculation process of calculating the predetermined output value with the input data acquired by the acquisition process as an input of the mapping, and a transmission process of transmitting time series data including data based on the detection values used when the input data is generated and one or a plurality of detection values which are before or after the detection value used for the input data in time series to an outside of the vehicle.

According to the first aspect, the time series data including the input data used for calculating the output value of the mapping is transmitted to the outside of the vehicle. The transmission process is executed by the vehicle control device mounted on the vehicle, and thus it is possible to transmit the data in various situations. Therefore, according to the first aspect, it is possible to verify whether the output values of the mapping in various situations are correct, in the outside of the vehicle. Moreover, the transmitted time series data includes the data based on one or a plurality of detection values which are before or after the detection value used for the input data in time series. Therefore, it is possible to provide more information for verification as compared with the case where solely the data based on the detection value used for the input data is transmitted.

In the vehicle control device according to the first aspect, the storage device may store first mapping data which is data defining first mapping that receives first input data based on the detection value of the in-vehicle sensor and outputs a first output value which is an output value having the information on the default state and second mapping data which is data defining second mapping that receives second input data based on the detection value of the in-vehicle sensor and outputs a second output value which is an output value having the information on the default state. The execution device may execute a first acquisition process of acquiring the first input data based on the detection value of the in-vehicle sensor, a first calculation process of calculating a first output value with the first input data acquired by the first acquisition process as an input of the first mapping, a second acquisition process of acquiring the second input data based on the detection value of the in-vehicle sensor, a second calculation process of calculating the second output value with the second input data acquired by the second acquisition process as an input of the second mapping, and a determination process of determining whether the first output value matches the second output value. The execution device may execute the transmission process when determination is made by the determination process that there is no match.

According to the first aspect, with the first mapping, the transmission process is not executed assuming that the second output value is at least as reliable as the first output value when the first output value matches the second output value. Therefore, in the above configuration, it is possible to reduce the communication load as compared with the case where the time series data based on the detection value used for calculating the second output value is transmitted all the time regardless of the determination result of the determination process.

In the vehicle control device according to the first aspect, the in-vehicle sensor may be a crank angle sensor of an internal combustion engine mounted on the vehicle. The first input data and the second input data may be rotation waveform variables which are variables including information on a difference between values of an instantaneous speed, which is a rotation speed of a crankshaft of the internal combustion engine at an angular interval smaller than an appearance interval of a compression top dead center of the internal combustion engine, at different angular intervals. The time series data may include an instantaneous speed variable which is a variable indicating the instantaneous speed in each of the angular interval that includes the information on the difference between the instantaneous speeds indicated by the rotation waveform variable used for calculating the second output value when determination is made by the determination process that there is no match and the angular interval that is generated before or after the angular interval in time series.

According to the first aspect, the instantaneous speed variable corresponding to the rotation waveform variable used for calculating the second output value and also an instantaneous speed variable which is before or after the same instantaneous speed variable in time series are transmitted by the transmission process. Accordingly, it is possible to provide more detailed information on rotation behavior of the crankshaft to the outside of the vehicle as compared to the case where solely the instantaneous speed variable corresponding to the rotation waveform variable used for calculating the second output value is transmitted.

In the vehicle control device according to the first aspect, the angular interval may be a second interval. The rotation waveform variable may be time series data configured as a variable indicating a difference between the instantaneous speed variables by the instantaneous speed variable itself in each of a plurality of continuous second intervals included in a first interval larger than the second interval. The time series data transmitted by the transmission process may include the instantaneous speed variable in each of the continuous second intervals adjacent to the first interval in addition to the instantaneous speed variable in each of the second intervals when determination is made by the determination process that there is no match.

According to the first aspect, the instantaneous speed variable in each of the continuous second intervals for both the first interval and the adjacent interval is transmitted by the transmission process. Therefore, it is possible to provide more detailed information on the rotation behavior of the crankshaft as compared with the case where solely the instantaneous speed variable at an intermittent interval is transmitted.

In the vehicle control device according to the first aspect, both the first output value and the second output value may be output values relating to presence or absence of a misfire. The time series data transmitted by the transmission process may include the instantaneous speed variable relating to the rotation waveform variable used for calculating the second output value when determination is made by the determination process that there is no match and the instantaneous speed variable when determination is made by the determination process that there is a match.

According to the first aspect, the instantaneous speed variable when determination is made that there is the match is also set as the transmission target. Therefore, it is easier to find a case where the rotation behavior of the crankshaft does not match, as compared with the case where solely the instantaneous speed variable when determination is made that there is no match is transmitted.

In the vehicle control device according to the first aspect, the time series data transmitted by the transmission process may include the instantaneous speed variable when determination is made by the determination process that there is no match and the instantaneous speed variable in a state determined to be matched at a time of transition from a state determined to be mismatched to the state determined to be matched by the determination process.

According to the first aspect, the instantaneous speed variable in the state determined to be matched at the time of transition from the state determined to be mismatched to the state determined to be matched by the determination process is set as the transmission target. Accordingly, it is possible to provide information on the rotation behavior of the crankshaft before or after the mismatched state returns to the matched state. Therefore, it is easier to find a case where the rotation behavior of the crankshaft does not match, as compared with the case where solely the instantaneous speed variable when determination is made that there is no match is transmitted.

In the vehicle control device according to the first aspect, the execution device may execute the transmission process at an end of traveling of the vehicle.

According to the first aspect, the transmission process is executed at the end of the traveling of the vehicle. Therefore, it is possible to reduce the calculation load of the vehicle control device during the traveling of the vehicle as compared with the case where the transmission process is executed during the traveling of the vehicle.

A second aspect of the present disclosure relates to a vehicle learning control system including a first storage device, a first execution device mounted on a vehicle, and a second execution device outside the vehicle. The first storage device stores mapping data including data that defines mapping that receives input data based on a plurality of detection values which are detection values of an in-vehicle sensor and which are before or after in time series and outputs a predetermined output value having information on a default state of a vehicle and that is learned by machine learning. The first execution device executes an acquisition process of acquiring the input data from the first storage device, a calculation process of calculating the predetermined output value with the input data acquired by the acquisition process as an input of the mapping, and a transmission process of transmitting time series data including data based on the detection values used when the input data is generated and one or a plurality of detection values which are before or after the detection value used for the input data in time series to an outside of the vehicle. The second execution device executes a reception process of receiving the time series data transmitted from the first execution device by the transmission process, a relearning data generation process of generating relearning data that is data for relearning the mapping based on the time series data received by the reception process, and a relearning process of relearning the mapping data based on the data generated by the relearning data generation process.

According to the second aspect, the mapping data can be relearned based on the input data to the mapping when determination is made that there is no match. Therefore, it is possible to provide the mapping that outputs values with high accuracy in various situations of the vehicle. The fact that the second execution device is "outside the vehicle" means that the second execution device is not an in-vehicle device.

In the vehicle learning control system according to the second aspect, the relearning data generation process may include a display process of displaying the time series data transmitted by the transmission process on a display device, a validity determination result taking-in process of taking in information on whether there is an error in an output value of the mapping, and a process of generating data for updating the mapping data based on the information taken by the validity determination result taking-in process.

According to the second aspect, the information such as the input data to the mapping transmitted by the transmission process is displayed on the display device. Therefore, it is possible to examine the validity of the output of the second mapping by a subject that can determine the state of the vehicle from the information of the second input data and the like separately from the first mapping and the second mapping. The determination result by the same subject is taken by the validity determination result taking-in process. Therefore, it is possible to determine whether the input data to be displayed is requested to be relearning data for updating the second mapping data.

In the vehicle learning control system according to the second aspect of the present disclosure, a second storage device outside the vehicle is further included. The first storage device is mounted on the vehicle. The second storage device stores third mapping data defining third mapping that receives data based on the detection value of the in-vehicle sensor and outputs a third output value having the information on the default state. The relearning data generation process includes a third calculation process of inputting the time series data transmitted by the transmission process to the third mapping to calculate the third output value and a process of generating data for updating the second mapping data based on presence or absence of matching between a calculation result of the third calculation process and a calculation result of the second calculation process.

According to the second aspect, determination is made whether there is a matching between the third output value and the second output value. Therefore, it is possible to verify the validity of the second output value and determine whether the second output value is requested to be the relearning data. The fact that the second storage device is "outside the vehicle" means that the second storage device is not the in-vehicle device.

In the vehicle learning control system according to the second aspect, the second execution device may execute a parameter transmission process of transmitting a relearned parameter learned by the relearning process to the vehicle, and the first execution device may execute a parameter reception process of receiving the parameter transmitted by the parameter transmission process.

According to the second aspect, the relearned parameters are received on the vehicle side. Therefore, it is possible to update the second mapping data by using the parameters received on the vehicle side.

A third aspect of the present disclosure relates to a vehicle control device including an execution device mounted on a vehicle. The execution device executes an acquisition process of acquiring input data based on a plurality of detection values which are detection values of an in-vehicle sensor and which are before or after in time series, a calculation process of calculating a predetermined output value with the input data acquired by the acquisition process as an input of mapping, and a transmission process of transmitting time series data including data based on the detection values used when the input data is generated and one or a plurality of detection values which are before or after the detection value used for the input data in time series to an outside of the vehicle.

A fourth aspect of the present disclosure relates to a vehicle control device including an execution device outside a vehicle. The execution device executes a reception process of receiving time series data from the vehicle, a relearning data generation process of generating relearning data that is data for relearning mapping based on the time series data received by the reception process, and a relearning process of relearning the mapping data based on the data generated by the relearning data generation process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a flowchart showing a procedure of a process executed by the system according to the second embodiment.

DETAILED DESCRIPTION OF EMBODIMENTS

First Embodiment

Hereinafter, a first embodiment of a vehicle learning control system will be described with reference to drawings.

Figure 1:
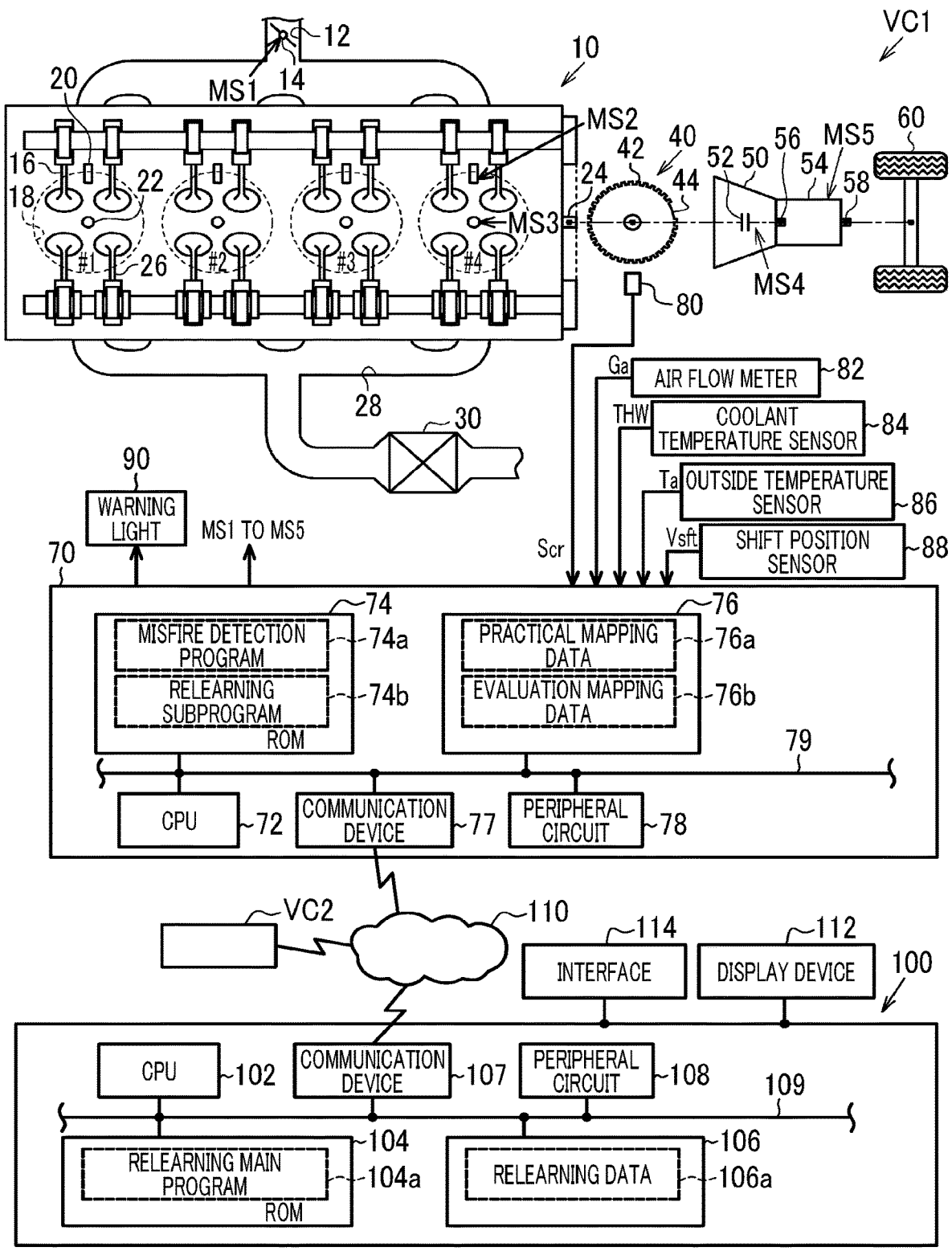
FIG. 1 is a diagram showing a configuration of a learning control system according to a first embodiment.

In an internal combustion engine 10 mounted on a vehicle VC1 shown in FIG. 1, a throttle valve 14 is provided in an intake passage 12. Air sucked from the intake passage 12 flows into respective combustion chambers 18 of cylinders #1 to #4 when intake valves 16 open. Fuel is injected into the combustion chamber 18 by a fuel injection valve 20. In the combustion chamber 18, an air-fuel mixture is supplied for combustion by spark discharge of an ignition device 22, and energy generated by the combustion is taken out as rotational energy of a crankshaft 24. The air-fuel mixture supplied for the combustion is discharged to an exhaust passage 28 as exhaust with an opening of an exhaust valve 26. A catalyst 30 having oxygen storage capacity is provided in the exhaust passage 28.

An input shaft 56 of a transmission 54 is connectable to the crankshaft 24 of the internal combustion engine 10 through a torque converter 50. The torque converter 50 includes a lock-up clutch 52, and the crankshaft 24 and the input shaft 56 are connected when the lock-up clutch 52 is in an engaged state. Drive wheels 60 are mechanically connected to an output shaft 58 of the transmission 54.

The crankshaft 24 is coupled to a crank rotor 40 provided with a tooth portion 42 indicating each of a plurality of rotation angles of the crankshaft 24. In the embodiment, 34 tooth portions 42 are illustrated. The crank rotor 40 is basically provided with the tooth portions 42 at 10° CA intervals, but one missing tooth portion 44 where the interval between adjacent tooth portions 42 is 30° CA is provided. The missing tooth portion is to indicate a reference rotation angle of the crankshaft 24.

With the internal combustion engine 10 as a control target, the control device 70 operates an operation unit of the internal combustion engine 10 such as the throttle valve 14, the fuel injection valve 20, or the ignition device 22 in order to control torque, an exhaust component ratio, or the like which is a control amount thereof. With the torque converter 50 as a control target, the control device 70 operates the lock-up clutch 52 in order to control an engagement state of the lock-up clutch 52 which is a control amount thereof. With the transmission 54 as a control target, the control device 70 operates the transmission 54 to control a gear ratio which is a control amount thereof. FIG. 1 shows respective operation signals MS1 to MS5 of the throttle valve 14, the fuel injection valve 20, the ignition device 22, the lock-up clutch 52, and the transmission 54.

When the control amount is controlled, the control device 70 refers to an output signal Scr of a crank angle sensor 80 that outputs a pulse for each angular interval between the tooth portions 42 provided at each 10° CA except the missing tooth portion 44 or an intake air amount Ga detected by an air flow meter 82. Further, the control device 70 refers to a coolant temperature THW which is a coolant temperature of the internal combustion engine 10 detected by a coolant temperature sensor 84, an outside temperature Ta detected by an outside temperature sensor 86, or a shift position Vsft of the transmission 54 detected by a shift position sensor 88.

The control device 70 includes a CPU 72, a ROM 74, a storage device 76 which is an electrically rewritable non-volatile memory, a communication device 77, and a peripheral circuit 78, which can communicate with each other through a local network 79. The peripheral circuit 78 includes a circuit that generates a clock signal that defines an internal operation, a power supply circuit, a reset circuit, or the like. The storage device 76 stores practical mapping data 76a and evaluation mapping data 76b. Here, the practical mapping data 76a is data actually used for monitoring a misfire of the internal combustion engine 10. On the contrary, the evaluation mapping data 76b is data which is a target of reliability evaluation thereof and is not used for monitoring the misfire of the internal combustion engine 10. The evaluation mapping data 76b is mounted on the control device 70 in a state where learning by machine learning is performed to some extent.

The control device 70 causes the CPU 72 to execute a program stored in the ROM 74 to control the control amount. Specifically, the ROM 74 stores a misfire detection program 74a or a relearning subprogram 74b. Here, the relearning subprogram 74b is a program for executing relearning of the evaluation mapping data 76b.

The communication device 77 is a device for communicating with a data analysis center 100 through a network 110 outside the vehicle VC1. The data analysis center 100 analyzes data transmitted from a plurality of vehicles VC1, VC2, and the like. The data analysis center 100 includes a CPU 102, a ROM 104, a storage device 106, a communication device 107, and a peripheral circuit 108, which can communicate with each other through a local network 109. The ROM 104 stores a relearning main program 104a that defines a process of generating data for relearning the evaluation mapping data 76b based on data transmitted from the vehicles VC1, VC2, and the like. The storage device 106 stores relearning data 106a which is data transmitted from the vehicles VC1, VC2, and the like and for relearning mapping defined by the evaluation mapping data 76b.

Figure 2:
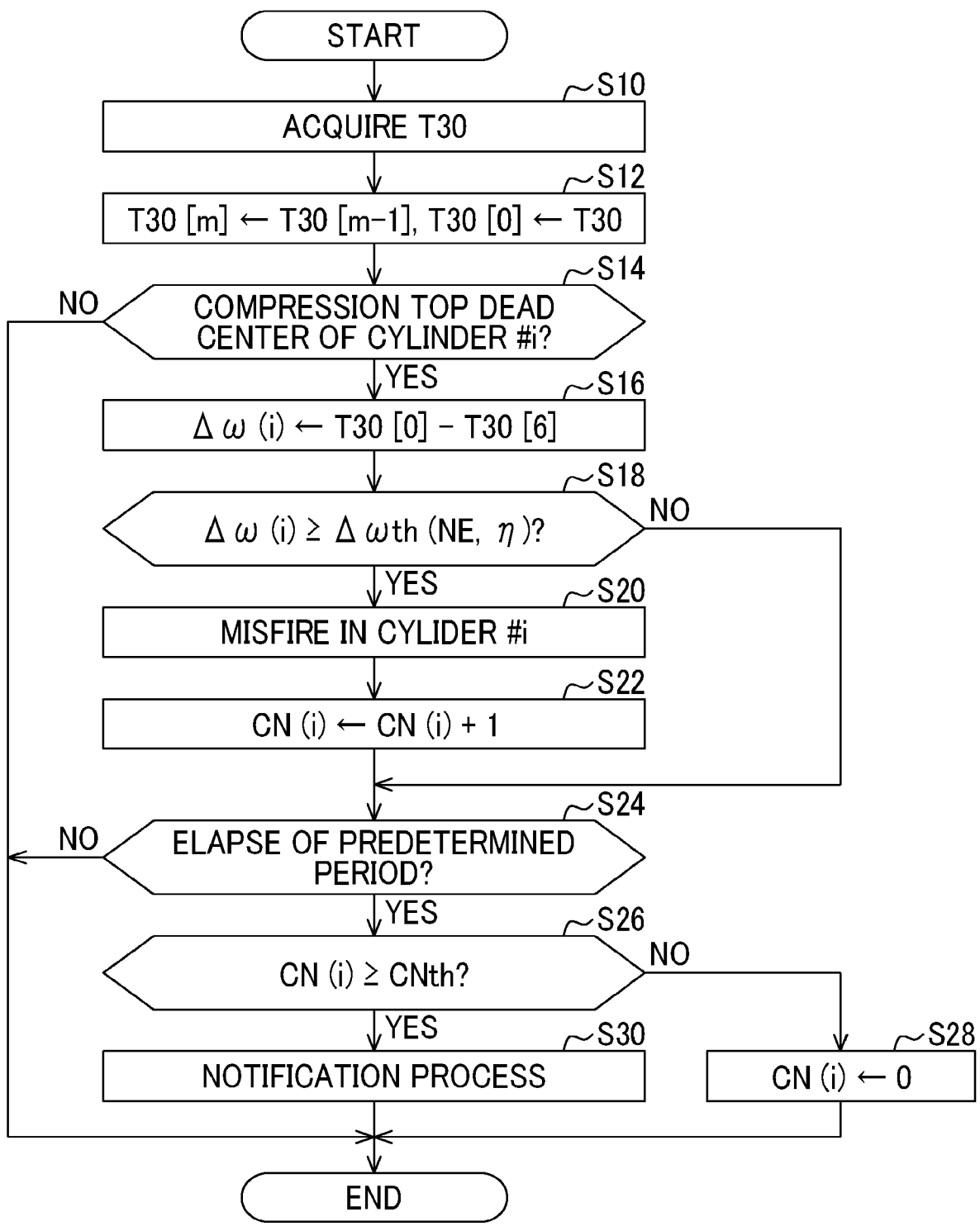
FIG. 2 is a flowchart showing a procedure of a process executed by a control device according to the first embodiment.

FIG. 2 shows a part of a process realized by the CPU 72 executing the misfire detection program 74a stored in the ROM 74. The process shown in FIG. 2 is a process using the practical mapping data 76a. The process shown in FIG. 2 is repeatedly executed, for example, at a predetermined cycle. In the following, a step number of each process is expressed by a number prefixed with "S".

In a series of processes shown in FIG. 2, the CPU 72 first acquires a minute rotation time T30 (S10). The minute rotation time T30 is a time requested for the crankshaft 24 to rotate by 30° CA and is calculated by the CPU 72 based on the output signal Scr of the crank angle sensor 80. Next, the CPU 72 sets the latest minute rotation time T30 acquired in the process of S10 to the minute rotation time T30[0] and sets a variable "m" of the minute rotation time T30[m] to a larger value as the value becomes earlier (S12). That is, the minute rotation time T30[m−1] immediately before the process of S12 is performed is set to the minute rotation time T30[m], as "m=1, 2, 3, and the like". Accordingly, for example, the minute rotation time T30 acquired by the process of S10 when the process in FIG. 2 is executed last time becomes the minute rotation time T30[1]. The minute rotation times T30 adjacent to each other in time series among the minute rotation times T30[0], T30[1], T30[2], and the like indicate a time requested for rotation at an angular interval of 30° CA adjacent to each other, and the angular intervals do not have overlapping portions.

Next, the CPU 72 determines whether the minute rotation time T30 acquired in the process of S10 is a time requested for rotation at an angular interval from 30° CA before a compression top dead center to the compression top dead center of any of the cylinders #1 to #4 (S14). When determination is made that the minute rotation time T30 is the time requested for rotation at the angular interval up to the compression top dead center (S14: YES), the CPU 72 substitutes "T30[0]-T30[6]" into a rotation fluctuation amount $\Delta\omega(i)$ of a cylinder #i which is a determination target in order to determine whether there is a misfire in a cylinder at the compression top dead center (S16). That is, a time requested for rotation at the angular interval from 30° CA before the compression top dead center to the compression top dead center of a cylinder at the compression top dead center immediately before the cylinder which is the determination target of the misfire is subtracted from the time requested for rotation at the angular interval from 30° CA before the compression top dead center to the compression top dead center of the cylinder which is a determination target of the misfire to quantify the rotation fluctuation amount $\Delta\omega$.

Next, the CPU 72 determines whether the rotation fluctuation amount $\Delta\omega$ (i) is equal to or larger than a defined amount $\Delta\omega th$ (S18). The process is a process of determining whether the misfire occurs in the cylinder which is the determination target of the misfire. Here, the CPU 72 variably sets the defined amount $\Delta\omega th$ based on a rotation speed NE and charging efficiency $\eta$.

Specifically, the CPU 72 performs a map calculation of the defined amount $\Delta\omega th$ in a state where map data using the rotation speed NE and the charging efficiency $\eta$ as input variables and the defined amount $\Delta\omega th$ as an output variable is stored in the storage device 76 in advance. The map data is a set of discrete values of the input variables and output variable values corresponding to respective input variable values. In the map calculation, for example, when the value of the input variable matches any of the values of the input variables in the map data, a value of corresponding output variable in the map data may be used as a calculation result. When the value of the input variable does not match any of the values of the input variables of the map data, a value obtained by interpolation of values of a plurality of output variables included in the map data may be used as the calculation result.

Incidentally, the rotation speed NE is calculated by the CPU 72 based on the output signal Scr of the crank angle sensor 80. Here, the rotation speed NE is an average value of the rotation speed when the crankshaft 24 rotates by an angular interval larger than an appearance interval of the compression top dead center (180° CA in the embodiment). The rotation speed NE is desirably an average value of the rotation speed when the crankshaft 24 rotates by one or more rotation angles of the crankshaft 24. The average value here is not limited to a simple average, but may be, for example, an exponential moving average process. In short, the average value may be a value obtained by calculating a low-frequency component from which a higher-order component that fluctuates at about the appearance interval of the compression top dead center is removed. The charging efficiency η is calculated by the CPU 72 based on the rotation speed NE and the intake air amount Ga.

The processes of S16 and S18 use the practical mapping data 76a. That is, the practical mapping data 76a defines mapping that receives the minute rotation time T30[0] and the minute rotation time T30[6] and outputs a logical value according to whether the misfire occurs in the cylinder which is the determination target as an output value. The logical value here is a value regarding whether the proposition that the rotation fluctuation amount Δw (i) is equal to or larger than the defined amount Δωth is true or false.

When determination is made that the rotation fluctuation amount Δw (i) is equal to or larger than the defined amount Δωth (S18: YES), the CPU 72 determines that the misfire occurs in the cylinder #i (S20). Next, the CPU 72 increments a misfire counter CN(i) of the cylinder #i (S22). The CPU 72 determines whether a logical sum of elapse of a predetermined period since the process of S18 is first executed in a state where the misfire counter CN(i) is initialized and elapse of a predetermined period since a process of S28 described below is performed is true (S24). When determination is made that the logical sum is true (S24: YES), the CPU 72 determines whether the misfire counter CN(i) is equal to or larger than a threshold value CNth (S26). When determination is made that the misfire counter CN(i) is less than the threshold value CNth (S26: NO), the CPU 72 initializes the misfire counter CN(i) (S28).

On the contrary, when determination is made that the misfire counter CN (i) is equal to or larger than the threshold value CNth (S26: YES), the CPU 72 operates a warning light 90 shown in FIG. 1 to notify a user that an abnormality occurs (S30). The CPU 72 temporarily ends the series of processes shown in FIG. 2 when the processes of S28 and S30 are completed or when negative determination is made in the processes of S14 and S24.

Figure 3:
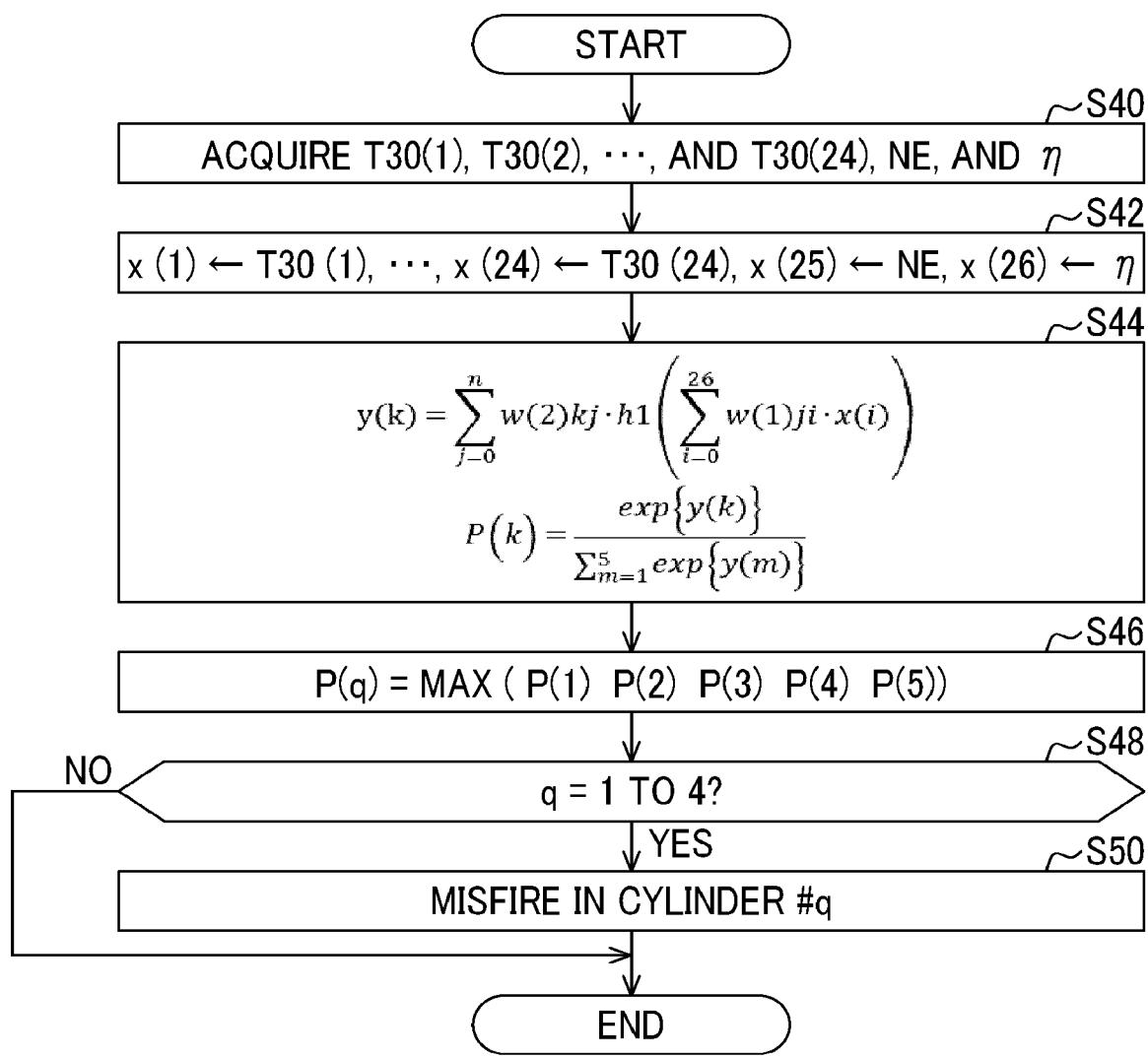
FIG. 3 is a flowchart showing a procedure of a process executed by the control device according to the first embodiment.

FIG. 3 shows a partial procedure of a process realized by the CPU 72 executing the misfire detection program 74a stored in the ROM 74. The process shown in FIG. 3 is a process using the evaluation mapping data 76b.

In a series of processes shown in FIG. 3, the CPU 72 first acquires minute rotation times T30(1), T30(2), . . . , and T30(24), the rotation speed NE, and the charging efficiency η (S40). Here, the minute rotation times T30(1), T30(2), and the like are different from the minute rotation times T30[1], T30[2], and the like in FIG. 2. In particular, the minute rotation times T30(1), T30(2), and the like indicate that the larger the number in parentheses, the later the value. Each of the minute rotation times T30(1) to T30(24) is a rotation time at each of 24 angular intervals obtained by equally dividing a rotation angle region of 720° CA at 30° CA.

Next, the CPU 72 substitutes the values acquired in the process of S40 into input variables x(1) to x(26) of the mapping defined by the evaluation mapping data 76b (S42). Specifically, the CPU 72 substitutes the minute rotation time T30(s) into an input variable x(s), as "s=1 to 24". That is, the input variables x(1) to x(24) are time series data of the minute rotation time T30. Further, the CPU 72 substitutes the rotation speed NE into the input variable x(25) and substitutes the charging efficiency η into the input variable x(26).

Next, the CPU 72 inputs the input variables x(1) to x(26) into the mapping defined by the evaluation mapping data 76b to calculate values of misfire variables P(1) to P(5) (S44). Here, assuming that "i=1 to 4", a misfire variable P(i) is a variable having a larger value when a probability of misfire in the cylinder #i is high than when the probability thereof is low. The misfire variable P(5) is a variable having a larger value when a probability that no misfire occurs in any of the cylinders #1 to #4 is higher than when the probability is low.

Specifically, the mapping defined by the evaluation mapping data 76b is a neural network having one intermediate layer. The neural network has a coefficient w(1)ji (j=0 to n, i=0 to 26) and an activation function h1(x) as a nonlinear mapping that nonlinearly transforms each of outputs of linear mapping defined by the coefficient w(1)ji. In the embodiment, a hyperbolic tangent is exemplified as the activation function h1(x). Incidentally, w(1)j0 and the like are bias parameters, and the input variable x(0) is defined as "1".

Further, the neural network has a coefficient w(2)kj (k=1 to 5, j=0 to n) and a softmax function that receives each of prototype variables y(1) to y(5) which are outputs of linear mapping defined by the coefficient w(2)kj and outputs the misfire variables P(1) to P(5).

Next, the CPU 72 specifies the largest misfire variable among the misfire variables P(1) to P(5) (S46). The CPU 72 determines whether the largest misfire variable P(q) is any of the misfire variables P(1) to P(4) or the misfire variable P(5) (S48). When determination is made that the largest misfire variable P(q) is any of the misfire variables P(1) to P(4) (S48: YES), the CPU 72 determines that a cylinder #q is misfired (S50).

Figure 4:
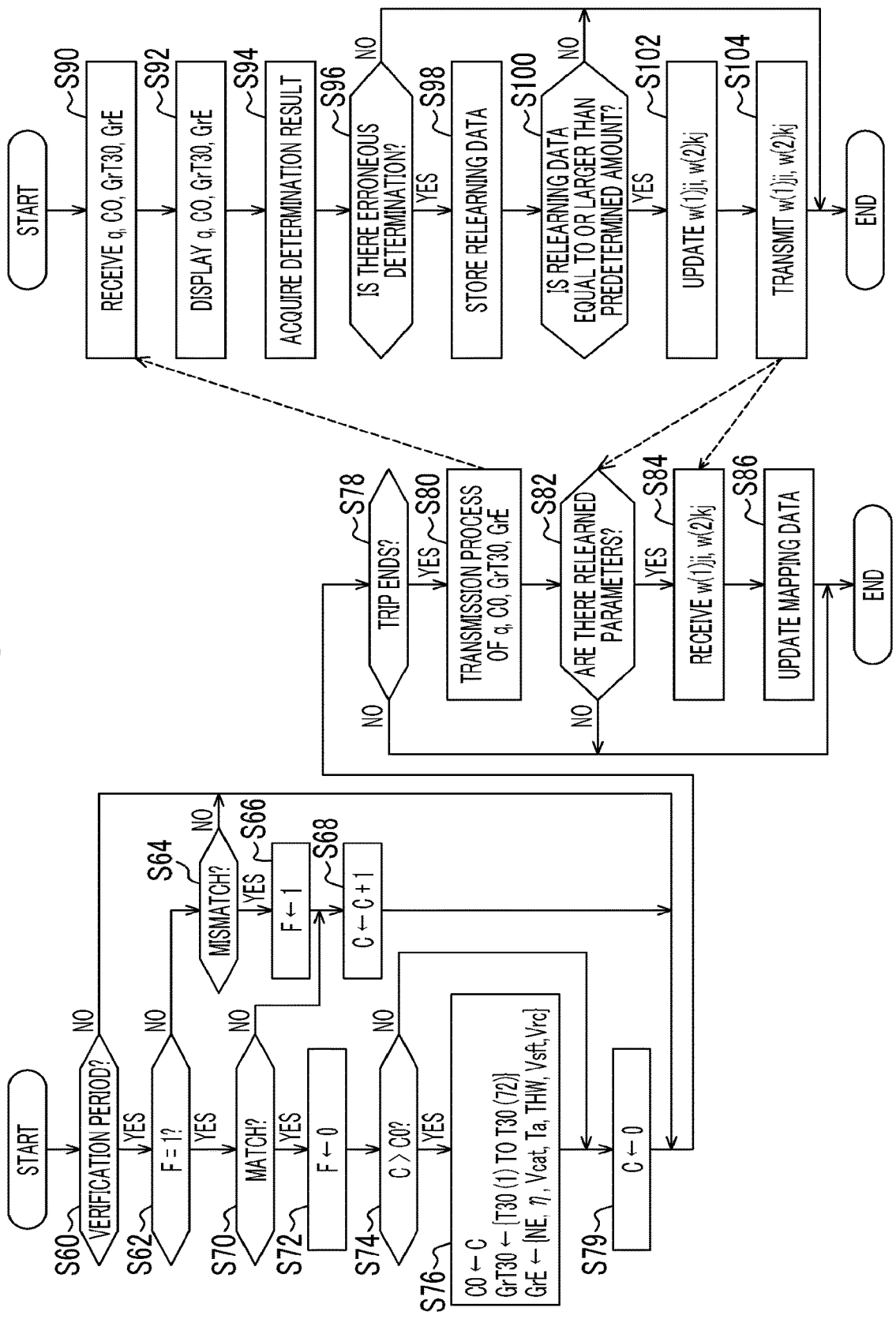
FIG. 4 is a flowchart showing a procedure of a process executed by the system according to the first embodiment.

The CPU 72 temporarily ends the series of processes shown in FIG. 3 when the process of S50 is completed or when negative determination is made in the process of S48. FIG. 4 shows a procedure of a process relating to the relearning of the evaluation mapping data 76b according to the embodiment. The process shown on the left side of FIG. 4 is realized by the CPU 72 executing the relearning subprogram 74b stored in the ROM 74 shown in FIG. 1. The process shown on the right side of FIG. 4 is realized by the CPU 102 executing the relearning main program 104a stored in the ROM 104. Hereinafter, the process shown in FIG. 4 will be described along a time series of the relearning process.

In a series of processes shown on the left side of FIG. 4, the CPU 72 first determines whether the evaluation mapping data 76b is in a verification period of the reliability (S60). Specifically, the following period is set as the verification period in the embodiment.

(A) A period during which the coolant temperature THW is equal to or less than a predetermined temperature: When the coolant temperature THW is low, the combustion tends to be unstable and it is difficult to enhance misfire detection accuracy as compared with a case where the coolant temperature THW is high. Therefore, the period is included in the verification period.

(B) A period during which the outside temperature Ta is equal to or less than a specified temperature: When the outside temperature Ta is low, the combustion tends to be unstable and it is difficult to enhance the misfire detection accuracy as compared with a case where the outside temperature Ta is high. Therefore, the period is included in the verification period.

(C) An execution period of a warm-up process of the catalyst 30: During the execution period of the warm-up process of the catalyst 30, the combustion is performed with reduced combustion efficiency. Therefore, the combustion tends to be unstable and it is difficult to enhance the misfire detection accuracy as compared with a case where the catalyst 30 is warmed up. Therefore, the period is included in the verification period.

(D) A period during which the charging efficiency η is equal to or less than a predetermined value: At a light load, the combustion tends to be unstable as compared with a case where the load is high and it is difficult to enhance the misfire detection accuracy as compared with a case where the load is middle and high. Therefore, the period is included in the verification period.

(E) A period during which a change amount ΔNE of the rotation speed NE per a predetermined time is equal to or larger than a predetermined value: In a transient operation, the misfire detection accuracy tends to be low as compared with in a steady operation. Therefore, the period is included in the verification period.

When determination is made that the evaluation mapping data 76b is in the verification period (S60: YES), the CPU 72 determines whether a flag F is "1" (S62). Here, the flag F becomes "1" when the misfire determination result by the process shown in FIG. 2 does not match the misfire determination result by the process shown in FIG. 3 and becomes "0" when the results match. When determination is made that the flag F is "0" (S62: NO), the CPU 72 determines whether there is a mismatch between the misfire determination result by the process shown in FIG. 2 and the misfire determination result by the process shown in FIG. 3 (S64). The CPU 72 determines that there is the mismatch therebetween when four determination results by the process of S18 in FIG. 2 in the same combustion cycle do not match the results by the process of S46 in FIG. 3. That is, the CPU 72 determines that there is the mismatch therebetween when P(5) is selected in the process of S46 although determination is made that the rotation fluctuation amount Δω (1) of the cylinder #1 is equal to or larger than the defined amount Δωth in the process of S18, for example.

When determination is made that there is the mismatch therebetween (S64: YES), the CPU 72 substitutes "1" for the flag F (S66). Next, the CPU 72 increments a counter C (S68). On the contrary, when determination is made that the flag F is "1" (S62: YES), the CPU 72 determines whether the misfire determination result by the process shown in FIG. 2 matches the misfire determination result by the process shown in FIG. 3 (S70). The CPU 72 proceeds to the process of S68 when determination is made that there is the mismatch therebetween (S70: NO) and substitutes "0" for the flag F when determination is made that there is the match therebetween (S70: YES) (S72). The CPU 72 determines whether the counter C is larger than a maximum value C0 (S74). When determination is made that the counter C is larger than the maximum value C0 (S74: YES), the CPU 72 updates the maximum value C0 to a current value of the counter C and updates a rotation time set GrT30 and an extra information set GrE (S76).

Figure 5:
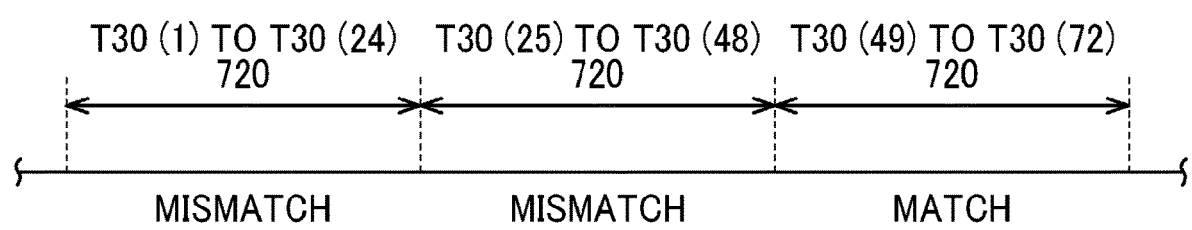
FIG. 5 is a diagram showing transmission data according to the first embodiment.

Specifically, the rotation time set GrT30 is a set of minute rotation times T30(1) to T30(72) for three combustion cycles, as shown in FIG. 5. However, the minute rotation times T30(49) to T30(72) are updated by the latest process of S70 so as to correspond to a combustion cycle in which determination is made that the misfire determination result by the process shown in FIG. 2 matches the misfire determination result by the process shown in FIG. 3. Here, when the maximum value C0 is equal to or larger than "2", both the minute rotation times T30(1) to T30(24) and the minute rotation times T30(25) to T30(48) correspond to a combustion cycle in which the misfire determination result by the process shown in FIG. 2 is different from the misfire determination result by the process shown in FIG. 3. An initial value of the maximum value C0 is zero.

The extra information set GrE has the rotation speed NE, the charging efficiency 11, a warm-up control variable Vcat indicating whether the warm-up process of the catalyst 30 is executed, the outside temperature Ta, the coolant temperature THW, the shift position Vsft of the transmission 54, and an engagement variable Vrc which is a variable indicating the engagement state of the lock-up clutch 52. It is desirable that each of the variables is a value in the combustion cycle before the combustion cycle for which the affirmative determination is made in the process of S70. The extra information set GrE is a set of variables that affects rotation behavior of the crankshaft 24 according to the presence or absence of the misfire, in addition to the rotation speed NE and the charging efficiency η as operating point variables which are inputs to the mapping defined by the evaluation mapping data 76b. That is, inertia constants from the crankshaft 24 to the drive wheels 60 are different from each other depending on the engagement state of the lock-up clutch 52 and the shift position Vsft. Therefore, the rotation behavior of the crankshaft 24 is different. The warm-up control variable Vcat, the outside temperature Ta, and the coolant temperature THW are variables indicating whether the combustion state is stable.

Returning to FIG. 4, the CPU 72 initializes the counter C when the process of S76 is completed or when negative determination is made in the process of S74 (S79). The CPU 72 determines whether a trip ends when the processes of S68 and S79 are completed or when negative determination is made in the processes of S60 and S64 (S78). Here, the trip is one period in which the traveling permission signal of the vehicle is in an ON state. In the embodiment, the traveling permission signal corresponds to an ignition signal. When determination is made that the trip ends (S78: YES), the CPU 72 operates the communication device 77 to transmit information "q" on the largest variable of the misfire variables P(1) to P(5), the maximum value C0, the rotation time set GrT30, and the extra information set GrE to the data analysis center 100 (S80).

On the contrary, as shown on the right side of FIG. 4, the CPU 102 receives the information "q" on the largest variable among the misfire variables P(1) to P(5), the maximum value C0, the rotation time set GrT30, and the extra information set GrE (S90). The CPU 72 displays waveform data relating to the rotation behavior of the crankshaft 24 expressed by the rotation time set GrT30 and displays the information "q" on the largest variable among the misfire variables P(1) to P(5), the maximum value C0 and the extra information set GrE, on a display device 112 shown in FIG. 1 (S92). The process provides a skilled person with information that allows the skilled person to determine whether the misfire occurs. That is, it is possible for the skilled person to determine with high accuracy whether the misfire occurs by visually recognizing the waveform data. In the case, with referring to the information of the extra information set GrE, the determination as to whether the misfire occurs becomes more reliable. Accordingly, it is possible for the skilled person to determine whether the misfire determination using the evaluation mapping data 76b is erroneous determination, based on whether the misfire occurs.

When a determination result is input by the skilled person operating the interface 114 shown in FIG. 1, the CPU 102 acquires the result (S94). The CPU 102 determines whether the determination result input by the operation of the interface 114 is determination that the misfire determination using the evaluation mapping data 76b is the erroneous determination (S96). When there is the determination that the misfire determination using the evaluation mapping data 76b is the erroneous determination (S96: YES), the CPU 102 stores at least the minute rotation times T30(25) to T30(48), the rotation speed NE, the charging efficiency η, and the determination result by the skilled person whether there is the misfire as the relearning data 106a, among the data received in the process of S90 (S98). The relearning data 106a includes data based on the data received from other vehicles VC2 and the like equipped with an internal combustion engine having the same specification as the internal combustion engine 10 in addition to the vehicle VC1.

Next, the CPU 102 determines whether the relearning data 106a stored in the storage device 106 is equal to or larger than a predetermined amount (S100). When determination is made that the relearning data 106a is equal to or larger than the predetermined amount (S100: YES), the CPU 102 updates the coefficients w(1)ji, w(2)kj, which are learned parameters of the evaluation mapping data 76b using the relearning data 106a as training data (S102). That is, the CPU 72 calculates the misfire variables P(1) to P(5) with the data other than the data relating to the determination result by the skilled person whether there is the misfire among the training data as the input variables x(1) to x(26) and generates teacher data based on the data relating to the determination result by the skilled person whether there is the misfire. For example, when the skilled person determines that the cylinder #1 is misfired, P(1)=1 and P(2) to P(5)=0. For example, when the determination of the skilled person is normal, P(1) to P(4)=0 and P(5)=1. The coefficients w(1)ji, w(2)kj are updated by a known method such that an absolute value of a difference between the teacher data and the misfire variables P(1) to P(5) output from the neural network becomes small.

Information on the coefficients w(1)ji, w(2)kj and the activation function h1, and information indicating that the softmax function is used in an output layer of the neural network are needed for the calculation process of the misfire variables P(1) to P(5). Regarding the above, for example, an instruction to transmit data relating to the above information may be issued from CPU 102 to control device 70 when an affirmative determination is made in the process of S100. Alternatively, the above information may be stored in storage device 106 in advance, for example.

The CPU 102 operates the communication device 107 to transmit the updated coefficients w(1)ji, w(2)kj to the vehicles VC1, VC2, and the like as relearned parameters (S104). The CPU 102 temporarily ends a series of processes shown on the right side of FIG. 4 when the process of S104 is completed or when negative determination is made in the processes of S96 and S100.

On the other hand, as shown on the left side of FIG. 4, the CPU 72 determines whether the relearned parameters are transmitted from the data analysis center 100 (S82). When determination is made that the relearned parameters are transmitted (S82: YES), the CPU 102 receives the coefficients w(1)ji, w(2)kj (S84) and updates the evaluation mapping data 76b stored in the storage device 76 (S86).

The CPU 72 temporarily ends the series of processes shown on the left side of FIG. 4 when the process of S86 is completed or when negative determination is made in the processes of S78 and S82. Here, the action and effect of the embodiment will be described.

The CPU 72 executes the process shown in FIG. 2 to monitor the presence or absence of the misfire in the internal combustion engine 10 and executes a notification process to deal with the misfire when the misfire frequently occurs, based on the practical mapping data 76a. Further, the CPU 72 executes the process shown in FIG. 3 to execute the misfire determination using the evaluation mapping data 76b, based on the evaluation mapping data 76b. The CPU 72 determines whether the misfire determination result using the evaluation mapping data 76b matches the misfire determination result using the practical mapping data 76a. When determination is made that the results do not match, the CPU 72 transmits the input variables and the like to the mapping defined by the evaluation mapping data 76b to the data analysis center 100 assuming that the learning of the evaluation mapping data 76b may be insufficient. Specifically, the minute rotation times T30(1) to T30(24) or the minute rotation times T30(49) to T30(72) are transmitted to the data analysis center 100 in addition to the minute rotation times T30(25) to T30(48) as input variables to the mapping.

On the contrary, the CPU 102 displays the waveform data or the like indicating the rotation behavior of the crankshaft 24 by the minute rotation times T30(1) to T30(72) transmitted from the CPU 72, on the display device 112. Accordingly, the skilled person determines whether the misfire occurs based on the waveform data or the like indicating the rotation behavior of the crankshaft 24 and, based on the determination, determines whether the determination using the evaluation mapping data 76b whether the misfire occurs is the erroneous determination. When the determination result of the skilled person is the determination that the determination of the presence or absence of misfire using the evaluation mapping data 76b is the erroneous determination, the CPU 102 stores at least a part of the data transmitted from the vehicle side in the storage device 106 as the relearning data 106a. When the relearning data 106a becomes equal to or larger than the predetermined amount, the CPU 102 updates the coefficients w(1)ji, w(2)kj and transmits the coefficients to each of the vehicles VC1, VC2, and the like as the relearned data.

Accordingly, in each of the vehicles VC1, VC2, and the like, the evaluation mapping data 76b is updated with the coefficients w(1)ji and w(2)kj updated by using the data that causes the erroneous determination using the evaluation mapping data 76b in a host vehicle and the data that causes the erroneous determination using the evaluation mapping data 76b in other vehicles.

Therefore, it is possible to update the evaluation mapping data 76b as data that can determine the misfire in various situations with high accuracy. When confirmation is made, by the determination of the skilled person when the mismatch occurs, that the evaluation mapping data 76b has higher reliability, it is possible to use the updated evaluation mapping data 76b as the practical mapping data 76a to monitor the misfire. Further, it is also possible to mount the learned model (mapping data) based on raw data mounted on the vehicles VC1, VC2, and the like as the practical mapping data from the beginning on a newly developed control device mounted on a vehicle including an internal combustion engine having the same number of cylinders.

According to the embodiment described above, the following effects can be further obtained.

(1) When the mismatch occurs between the determination result by the practical mapping data 76a and the determination result based on the evaluation mapping data 76b, the minute rotation times T30(25) to T30(48) in the mismatched combustion cycle and the minute rotation times T30(49) to T30(72) in the combustion cycle that restores from the mismatch to the match are transmitted to the data analysis center 100. Accordingly, the information on the state where the mismatch occurs and the information at the time of transition to the state where the mismatch is solved are transmitted. Therefore, it is possible for the skilled person to determine whether the misfire occurs with higher accuracy as compared with the case where solely the minute rotation times T30(25) to T30(48), which are the waveform data of one mismatched combustion cycle, are transmitted.

(2) When there is the mismatch between the determination result by the practical mapping data 76a and the determination result based on the evaluation mapping data 76b, the extra information set GrE is also transmitted. Accordingly, it is possible for the skilled person to determine whether the misfire occurs with higher accuracy as compared to the case where solely the minute rotation times T30(1) to T30(72), which are the waveform data indicating the rotation behavior of the crankshaft 24, are transmitted.

(3) When there is the mismatch between the determination result by the practical mapping data 76a and the determination result based on the evaluation mapping data 76b, the number of times the mismatch occurs continuously is counted and solely the data with the largest number of times the mismatch continuously occurs in one trip is transmitted to the data analysis center 100. Here, there is a high possibility that there is a difference between the reliability of the misfire determination using the practical mapping data 76a and the reliability of the misfire determination using the evaluation mapping data 76b instead of the influence of accidental noise or the like, in the case where the mismatch continuously occurs as compared with the case where the mismatch occurs solely once. Therefore, it is possible to reduce the data amount requested for the communication with the data analysis center 100 and transmit information that is as useful as possible in specifying the feature of the evaluation mapping data 76b by transmitting solely the data with the largest number of times the mismatch continuously occurs.

(4) When there is the mismatch between the determination result by the practical mapping data 76a and the determination result based on the evaluation mapping data 76b, the data when the mismatch occurs is transmitted to the data analysis center 100 at the end of the trip. At the end of the trip, the calculation load of the control device 70 is smaller than when the vehicle is traveling. Therefore, it is possible to suppress that the calculation load applied to the control device 70 is excessively increased by the transmission process.

Second Embodiment

Hereinafter, a second embodiment will be described with reference to drawings, focusing on differences from the first embodiment.

Figure 6:
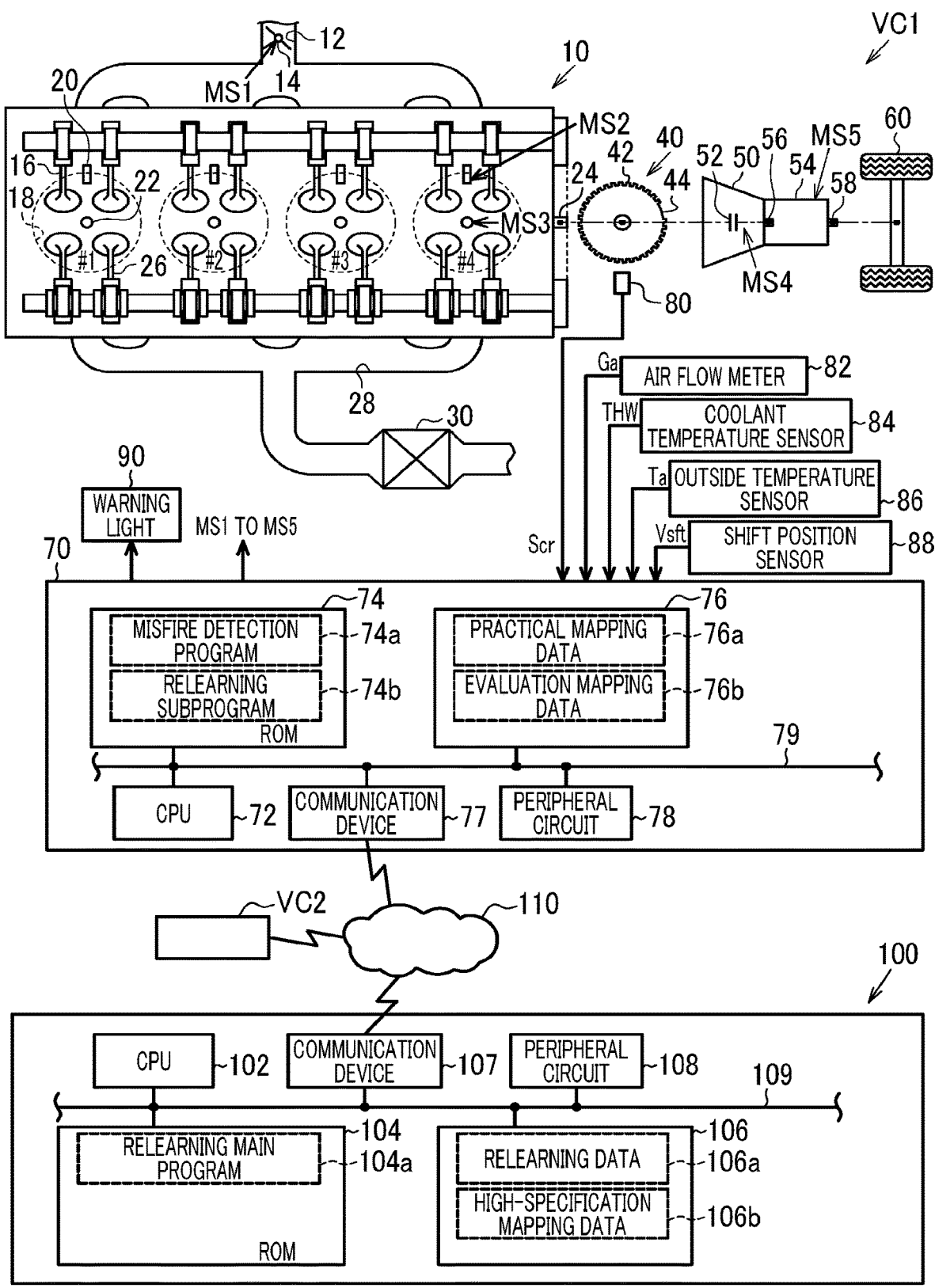
FIG. 6 is a diagram showing a configuration of a learning control system according to a second embodiment.

FIG. 6 shows a configuration of a learning control system according to the second embodiment. In FIG. 6, the same reference numerals are assigned to members corresponding to the members shown in FIG. 1 for convenience. The storage device 106 shown in FIG. 6 stores high-specification mapping data 106b. The misfire determination simulating the skilled person is possible with the high-specification mapping data 106b, in exchange for a large number of dimensions of the input variables and a complicated mapping structure. In learning the high-specification mapping data 106b, the rotation time set GrT30 or the extra information set GrE in the process in FIG. 4, and the determination result of the skilled person by the processes of S94 and S96 are used as training data.

Figure 7:
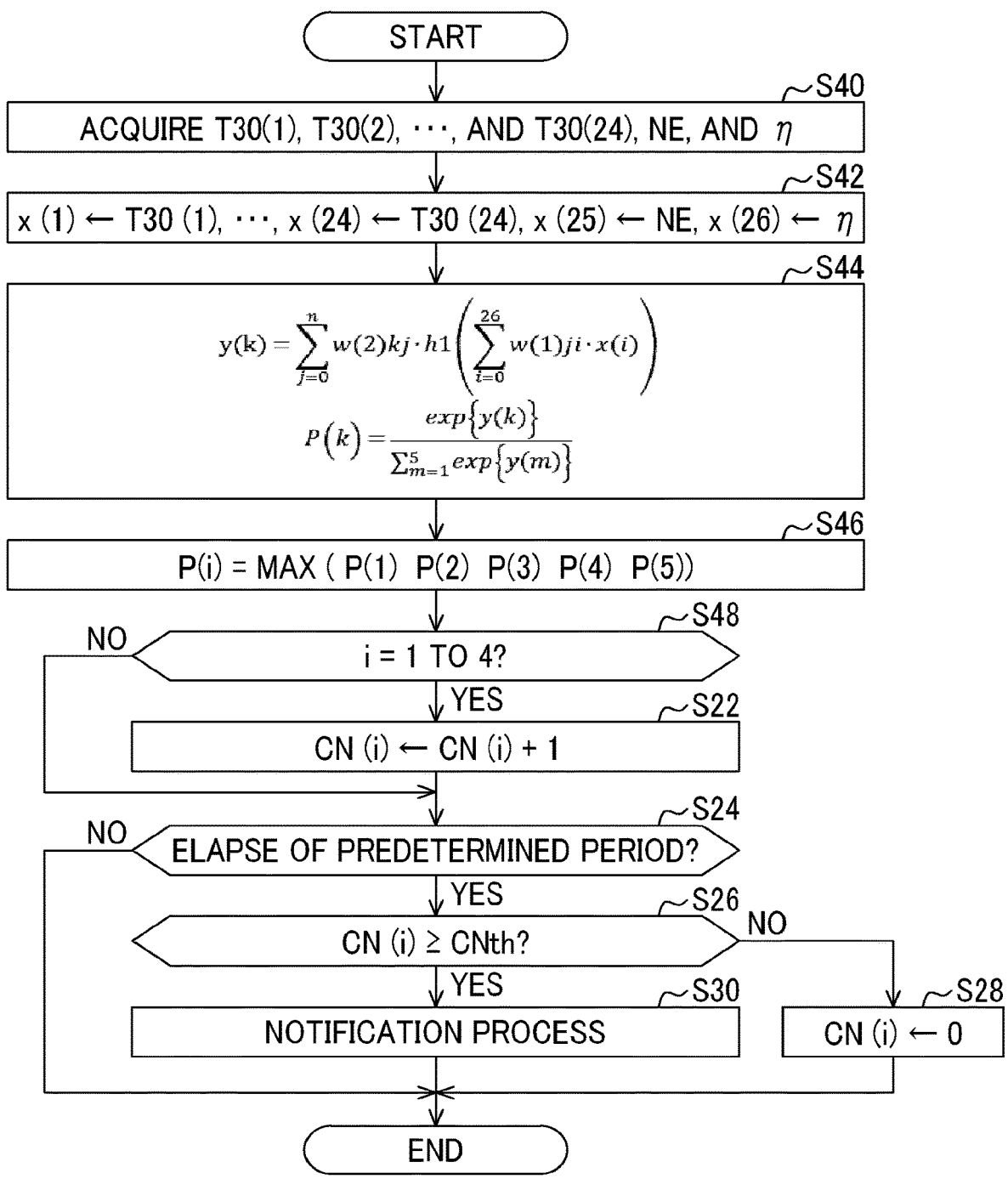
FIG. 7 is a flowchart showing a procedure of a process executed by a control device according to the second embodiment.

In the embodiment, a case is exemplified in which the reliability of the evaluation mapping data 76b is improved by the process of the first embodiment and the evaluation mapping data 76b is implemented as the practical mapping data 76a. FIG. 7 shows a part of a process realized by the CPU 72 executing the misfire detection program 74a stored in the ROM 74. The process shown in FIG. 7 is a process using the practical mapping data 76a. The process shown in FIG. 7 is repeatedly executed at a predetermined cycle, for example. In FIG. 7, the same step numbers are assigned to processes corresponding to the processes shown in FIGS. 2 and 3 for convenience.

In a series of processes shown in FIG. 7, the CPU 72 executes the processes similar to the processes of S40 to S48 in FIG. 3. That is, the evaluation mapping data 76b used in the process in FIG. 3 is the practical mapping data 76a in the embodiment. Therefore, the processes of S40 to S48 are executed using the practical mapping data 76a. In FIG. 7, the largest variable among the misfire variables P(1) to P(5) is described as the misfire variable P(i). The misfire variable P(i) is different from the misfire variable P(q) in FIG. 3 in description, but the process itself is the same.

When affirmative determination is made in the process of S48, the CPU 72 executes the processes of S22 to S30 for the cylinder #i for which the misfire is determined to occur. When negative determination is made in the process of S48, the CPU 72 executes the processes of S24 to S30.

Figure 8:
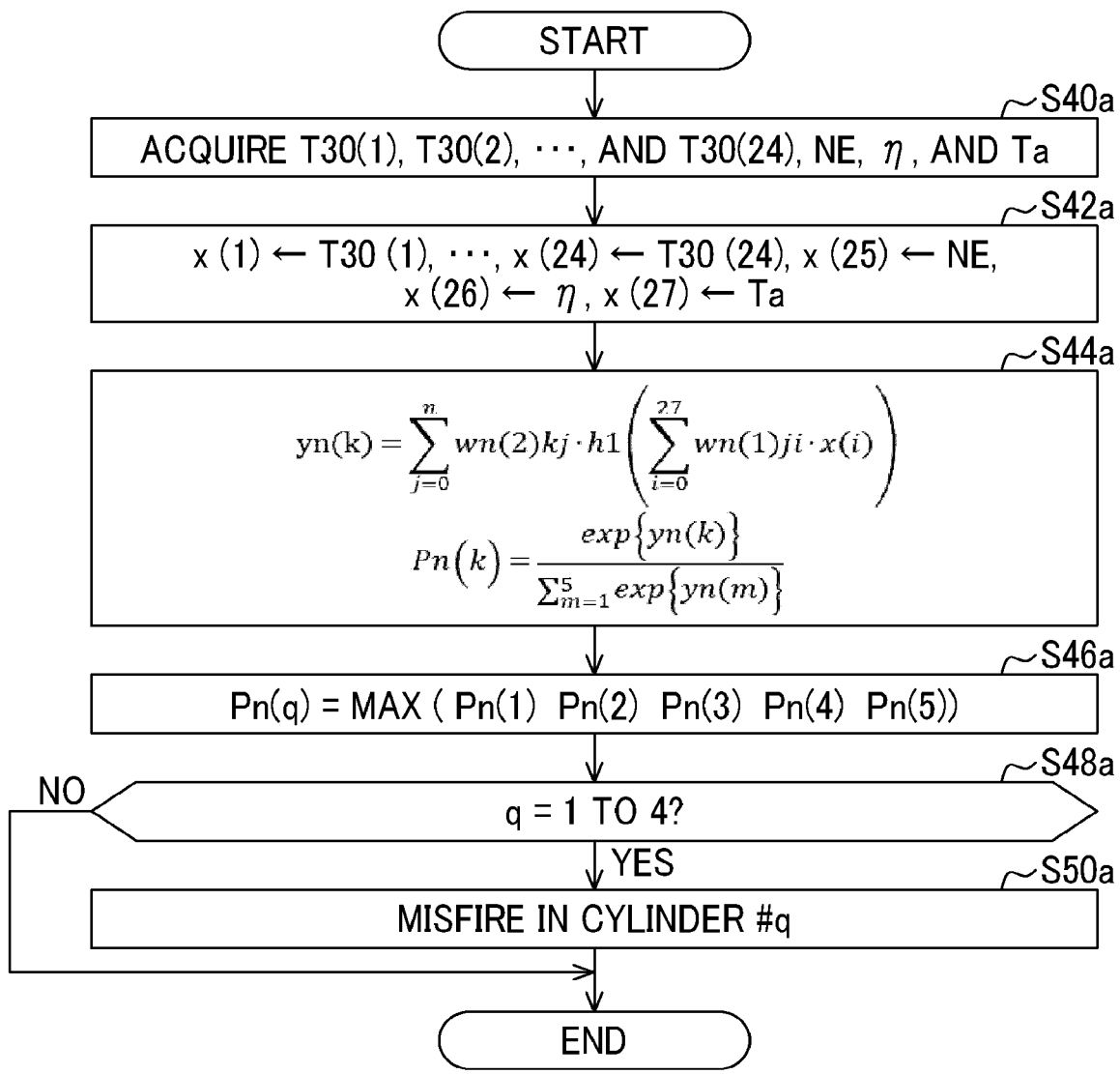
FIG. 8 is a flowchart showing a procedure of a process executed by the control device according to the second embodiment.

FIG. 8 shows a partial procedure of a process realized by the CPU 72 executing the misfire detection program 74a stored in the ROM 74. The process shown in FIG. 8 is a process using the evaluation mapping data 76b.

In a series of processes shown in FIG. 8, the CPU 72 first acquires the outside temperature Ta in addition to the minute rotation times T30(1), T30(2), . . . , and T30(24), the rotation speed NE, and the charging efficiency (S40a).

Next, the CPU 72 substitutes values acquired in the process of S40a into input variables x(1) to x(27) of the mapping defined by the evaluation mapping data 76b (S42a). Specifically, the CPU 72 executes the same process as that of S42 for the input variables x(1) to x(26) and substitutes the outside temperature Ta into the input variable x(27).

Next, the CPU 72 inputs the input variables x(1) to x(27) to the mapping defined by the evaluation mapping data 76b to calculate misfire variables Pn(1) to Pn(5) corresponding to the misfire variables P(1) to P(5) (S44a). Specifically, the mapping defined by the evaluation mapping data 76b is a neural network having one intermediate layer. The neural network has a coefficient wn(1)ji (j=0 to n, i=0 to 27) and the activation function h1(x) as an input-side nonlinear mapping that nonlinearly transforms each of outputs of linear mapping defined by the coefficient wn(1)ji. In the embodiment, the hyperbolic tangent is exemplified as the activation function h1(x). Incidentally, wn(1)j0 and the like are the bias parameters, and the input variable x(0) is defined as "1".

Further, the neural network has a coefficient wn(2)kj (k=1 to 5, j=0 to n) and a softmax function that receives each of prototype variables yn(1) to yn(5) which are outputs of linear mapping defined by the coefficient wn(2)kj and outputs the misfire variable Pn.

The CPU 72 specifies the largest misfire variable Pn(q) among the misfire variables Pn(1) to Pn(5) (S46a). The CPU 72 determines whether the largest misfire variable Pn(q) is any of "1 to 4" (S48a). When determination is made that the largest misfire variable Pn(q) is any of "1 to 4" (S48a: YES), the CPU 72 determines that the cylinder #q is misfired (S50a). The CPU 72 temporarily ends the series of processes shown in FIG. 8 when the process of S50a is completed or when negative determination is made in S48a.

FIG. 9 shows a procedure of a process relating to the relearning of the evaluation mapping data 76b according to the embodiment. The process shown on the left side of FIG. 9 is realized by the CPU 72 executing the relearning subprogram 74b stored in the ROM 74 shown in FIG. 6. The process shown on the right side of FIG. 9 is realized by the CPU 102 executing the relearning main program 104a stored in the ROM 104. In FIG. 9, the same step numbers are assigned to processes corresponding to the processes shown in FIG. 4 for convenience. Hereinafter, the process shown in FIG. 9 will be described along a time series of the relearning process.

In a series of processes shown on the right side of FIG. 9, when the process of S90 is completed, the CPU 102 substitutes corresponding values into input variables x(1) to x(79) of mapping defined by the high-specification mapping data 106b (S110). That is, the CPU 102 substitutes the minute rotation time T30(s) into the input variable x(s) as "s=1 to 72", substitutes the rotation speed NE into the input variable x(73), and substitutes the charging efficiency η into the input variable x(74). Further, the CPU 102 substitutes the outside temperature Ta into the input variable x(75), substitutes the warm-up control variable Vcat into the input variable x(76), substitutes the coolant temperature THW into the input variable x(77), substitutes the shift position Vsft into the input variable x(78), and substitutes the engagement variable Vrc into the input variable x(79). Next, the CPU 102 substitutes the input variables x(1) to x(79) into the mapping defined by the high-specification mapping data 106b to calculate misfire variables Pm(1) to Pm(5) corresponding to the misfire variables Pn(1) to Pn(5) (S112).

In the embodiment, the mapping defined by the high-specification mapping data 106b is configured of a neural network in which the number of intermediate layers is "p" and the activation functions h1 to hp of each intermediate layer are the hyperbolic tangents. Here, assuming that m=1, 2, ..., and p, a value of each node in an m-th intermediate layer is generated by inputting the output of the linear mapping defined by a coefficient wm(m) to an activation function hm. Here, n1, n2, ..., and np are the number of nodes in a first, a second, ..., and a p-th intermediate layer, respectively. For example, a value of each node in the first intermediate layer is generated by inputting an output when the input variables x(1) to x(79) are input to linear mapping defined by a coefficients wm(1)ji (j=0 to n1, i=0 to 79) into the activation function h1. Incidentally, wm(1)j0 and the like are the bias parameters, and the input variable x(0) is defined as "1".

The neural network has a coefficient wm(p+1)lr (l=1 to 5, r=0 to np) and a softmax function that receives each of prototype variables ym(1) to ym(5) which are outputs of linear mapping defined by the coefficient wm(p+1)lr (l=1 to 5, r=0 to np) and outputs the misfire variables Pm(1) to Pm(5).

The CPU 102 determines whether the misfire determination based on the evaluation mapping data 76b is the erroneous determination (S96). That is, the CPU 102 determines that there is the erroneous determination when the largest variable among the misfire variables Pm(1) to Pm(5) does not match the information "q" on the largest variable among the misfire variables Pn(1) to Pn(5) received in the process of S90. Specifically, for example, the CPU 102 determines that there is the erroneous determination when the largest variable among the misfire variables Pm(1) to Pm(5) is the misfire variable Pm(1) while the largest variable among the misfire variables Pn(1) to Pn(5) is the misfire variable Pn(5).

The CPU 102 executes the processes of S98 and S100 when determination is made that there is the erroneous determination (S96: YES) and updates the coefficients wn(1)ji, wn(2)kj which are learned parameters of the evaluation mapping data 76b with the relearning data 106a as training data when affirmative determination is made in the process of S100 (S102a). The CPU 102 operates the communication device 107 to transmit the updated coefficients wn(1)ji, wn(2)kj to the vehicles VC1, VC2, and the like as the relearned parameters (S104a). The CPU 102 temporarily ends the series of processes shown on the right side of FIG. 9 when the process of S104a is completed or when negative determination is made in the processes of S96 and S100.

On the other hand, as shown on the left side of FIG. 9, when determination is made that there are the relearned parameters (S82: YES), the CPU 72 receives the coefficients wn(1)ji, wn(2)kj (S84a) and updates the evaluation mapping data 76b stored in the storage device 76 (S86).

The CPU 72 temporarily ends the series of processes shown on the left side of FIG. 9 when the process of S86 is completed or when negative determination is made in the processes of S78 and S82. As described above, in the embodiment, when the determination result using the practical mapping data 76a does not match the determination result using the evaluation mapping data 76b, the determination result using the evaluation mapping data 76b is verified by the determination using the high-specification mapping data 106b. Accordingly, it is possible to verify the determination result using the evaluation mapping data 76b without relying on the determination by the skilled person.

Correspondence

The correspondence between the items in the above embodiment and the items described in the "SUMMARY" column is as follows. An execution device corresponds to the CPU 72 and the ROM 74, and the storage device corresponds to the storage device 76. Mapping data corresponds to the evaluation mapping data 76b. An acquisition process corresponds to the process of S40 in FIG. 3 and the process of S40a in FIG. 8. A calculation process corresponds to the processes of S42 and S44 in FIG. 3 and the processes of S42a and S44a in FIG. 8. A transmission process corresponds to the process of S80 in FIG. 4. First mapping data corresponds to the practical mapping data 76a. A first acquisition process corresponds to the process of S10 in FIG. 2 and the process of S40 in FIG. 7, and the first calculation process corresponds to the processes of S16 and S18 in FIG. 2 and the processes of S42 and S44 in FIG. 7. A determination process corresponds to the processes of S64 and S70 in FIG. 4. Rotation waveform variables correspond to the minute rotation times T30(1) to T30(24). An instantaneous speed variable corresponds to the minute rotation time T30. A second interval corresponds to 30° CA, and the first interval corresponds to 720° CA. Instantaneous speed variables when determination is made that there is no match correspond to T30(25) to T30(48), and the instantaneous speed variables when determination is made that there is a match correspond to T30(49) to T30(72). A case where the affirmative determination is made in the process of S78 corresponds to the execution of the process of S80. A second execution device corresponds to the CPU 102 and the ROM 104. A reception process corresponds to the process of S90 in FIG. 4. A relearning data generation process corresponds to the processes of S92 to S98 in FIG. 4 and the processes of S110, S112, S96, and S98 in FIG. 9. A relearning process corresponds to the process of S102 in FIG. 4 and the process of S102a in FIG. 9. A display process corresponds to the process of S92 in FIG. 4. A validity determination result taking-in process corresponds to the process of S94. A second storage device corresponds to the storage device 106. Third mapping data corresponds to the high-specification mapping data 106b. A third calculation process corresponds to the processes of S110 and S112. A parameter transmission process corresponds to the process of S104 in FIG. 4 and the process of S104a in FIG. 9. A parameter reception process corresponds to the process of S84 in FIG. 4 and the process of S84a in FIG. 9.

Another Embodiment

The embodiment can be implemented with the following modifications. The embodiment and the following modification examples can be implemented in combination with each other within a technically consistent range.

About Default State of Vehicle

A default state of the vehicle in which the information is included in the output of the mapping is not limited to the example described in the above embodiment. For example, a state of the internal combustion engine may be as follows.

(a) State Relating to Imbalance

Here, the imbalance is a variation between actual air-fuel ratios when a fuel injection valve is operated to control the air-fuel ratio of the air-fuel mixture in each of a plurality of cylinders to be equal to each other. In the case, the practical mapping data 76a as the first mapping data may include, for example, data defining mapping that outputs a value when an imbalance variable, which is a variable indicating a degree of imbalance, indicates the value on a rich side, based on a change amount of a detection value of an air-fuel ratio sensor on an upstream side of the catalyst 30 per a predetermined time. Further, the practical mapping data 76a may include data defining mapping that outputs a value when the imbalance variable indicates the value on a lean side, based on the fluctuation in the minute rotation time T30. The evaluation mapping data 76b as second mapping data may be data defining a neural network that receives the time series data including the minute rotation times T30(1) to T30(24) and time series data of the detection value of the air-fuel ratio sensor on the upstream side of the catalyst 30 during the period, and outputs the value of the imbalance variable. Instead of the above, mapping that receives the time series data including the minute rotation times T30(1) to T30(24) and the time series data of the detection value of the air-fuel ratio sensor on the upstream side of the catalyst 30 during the period may be set as first mapping and mapping with further increased inputs may be set as second mapping.

In the case, data to be transmitted from the vehicle to the data analysis center 100 may include, for example, the minute rotation time T30 and the detection value of the air-fuel ratio sensor on the upstream side used for calculating the imbalance variable when the mismatch occurs, and the time series data of the minute rotation time T30 and the time series data of the detection value of the air-fuel ratio sensor on the upstream side which are adjacent in time series to the minute rotation time T30 and detection value used for the calculation. Accordingly, it is possible for the skilled person to more accurately determine whether the imbalance variable is a correct value, based on the rotation behavior of the crankshaft 24 or behavior of the detection value of the air-fuel ratio.

(b) Deterioration Degree of Catalyst 30

In the case, in order to calculate a value of a deterioration variable which is a variable indicating a deterioration degree of the catalyst 30 using the first mapping, active control may be used such that oxygen is excessively present in the exhaust flowing into the catalyst 30 at the timing when the detection value of the air-fuel ratio sensor downstream of the catalyst 30 is inverted from lean to rich. The practical mapping data 76a as the first mapping data may be set as data defining mapping that outputs the value of the deterioration variable based on an oxygen amount flowing into the catalyst 30 until the detection value of the air-fuel ratio sensor downstream of the catalyst 30 is inverted from rich to lean by performing the active control. The evaluation mapping data 76b defining the second mapping data may be, for example, data defining a neural network that receives the time series data of the detection value of the air-fuel ratio sensor on the upstream side of the catalyst 30, time series data of the detection value of the air-fuel ratio sensor on the downstream side, the rotation speed NE, the charging efficiency η, and the temperature of the catalyst 30, and outputs the value of the deterioration variable. In the case, the calculation process of the value of the deterioration variable by the second mapping may be performed when the active control is not executed. Accordingly, it is possible to advance the learning of the second mapping that determines the presence or absence of deterioration without the execution of the active control and improve the determination accuracy. For example, the first mapping may be set as a neural network that receives the time series data of the detection value of the air-fuel ratio sensor on the upstream side of the catalyst 30, the time series data of the detection value of the air-fuel ratio sensor on the downstream side, the rotation speed NE, the charging efficiency and the temperature of the catalyst 30 and outputs the value of deterioration variable, and the second mapping may be set as a neural network with increased input dimensions compared with the first mapping.

In the case, the data to be transmitted from the vehicle to the data analysis center 100 may include, for example, time series data of the detection value on the upstream side and time series data of the detection value on the downstream side which are adjacent in time series to time series data of the detection values on the upstream side and the downstream side used for calculating the deterioration variable when the mismatch occurs. Accordingly, it is possible to more accurately determine whether the deterioration variable is a correct value in the data analysis center 100.

(c) PM Amount Trapped by Filter

Here, it is assumed that the catalyst 30 is provided with a filter for trapping particulate matter (PM). In the case, the practical mapping data 76a as the first mapping data may include, for example, map data that determines a relationship between the operating point variable of the internal combustion engine 10 and a base value of a PM amount, map data that determines a relationship between an ignition timing and a correction amount of the PM amount, and map data that determines a relationship between a coolant temperature of the internal combustion engine 10 and the correction amount of the PM amount. The evaluation mapping data 76b as the second mapping data may be data defining a neural network that receives the operating point variable, the ignition timing, the coolant temperature, and the like and outputs the PM amount. For example, the first mapping may be set as a neural network that receives the operating point variable, the ignition timing, and the coolant temperature, and the second mapping may be set as a neural network with increased input dimensions compared with the first mapping.

In the case, the data to be transmitted from the vehicle to the data analysis center 100 may include, for example, time series data including input data used for calculating the PM amount during a period from the start of the internal combustion engine 10 to a point of time when the mismatch occurs. Accordingly, it is possible to calculate the PM amount based on the time series data and determine the validity of the calculated PM amount using the evaluation mapping data 76b, in the data analysis center 100.

(d) Temperature of Catalyst 30

In the case, the practical mapping data 76a as the first mapping data may be, for example, data defining a first-order lag filter or a second-order lag filter that receives a detection value of an exhaust temperature on the upstream side of the catalyst 30. The evaluation mapping data 76b defining the second mapping data may be data defining a neural network that receives time series data of the detection value of the exhaust temperature, the operating point variable, and the detection value of the air-fuel ratio sensor on the upstream side of the catalyst 30, and a previous value of the temperature of the catalyst 30. For example, the first mapping may be set as the neural network that receives time series data of the detection value of the exhaust temperature, the operating point variable, and the detection value of the air-fuel ratio sensor on the upstream side of the catalyst 30, and a previous value of the temperature of the catalyst 30, and the second mapping may be set as a neural network with increased input dimensions compared with the first mapping.

In the case, the data to be transmitted from the vehicle to the data analysis center 100 may include, for example, time series data including input data used for calculating the temperature of the catalyst 30 during the period from the start of the internal combustion engine 10 to the point of time when the mismatch occurs. Accordingly, it is possible to calculate the temperature of the catalyst 30 based on the time series data and determine the validity of the temperature of the catalyst 30 calculated using the evaluation mapping data 76b, in the data analysis center 100.

(e) State Relating to Deterioration in Responsiveness of Air-Fuel Ratio Sensor

In the case, the active control, instead of normal air-fuel ratio feedback control, that significantly changes the air-fuel ratio alternately between lean and rich may be used in the deterioration determination process using the practical mapping data 76a as the first mapping data. The practical mapping data 76a may be data for calculating the value of the deterioration variable which is a variable indicating the deterioration degree, based on a time requested until the detection value of the air-fuel ratio sensor is inverted from rich to lean or from lean to rich by the active control. The evaluation mapping data 76b as the second mapping data may be data defining a neural network that receives time series data of an injection amount and the time series data of the detection value of the air-fuel ratio sensor and outputs the value of the deterioration variable. In the case, the calculation process of the value of the deterioration variable by the second mapping may be performed when the active control is not executed.

In the case, the data to be transmitted from the vehicle to the data analysis center 100 may include, for example, data adjacent to the data input to the evaluation mapping for the time series data of the detection values of the air-fuel ratio sensor, in addition to the data input to the mapping defined by the evaluation mapping data 76b. Accordingly, it is possible to more accurately verify the validity of the value of the deterioration variable calculated using the evaluation mapping data 76b.

(f) State Relating to Oxygen Storage Amount of Catalyst

In the case, the practical mapping data 76a as the first mapping data may be map data with a difference between an average value of the detection values of the air-fuel ratio sensor on the upstream side of the catalyst 30 and an average value of the detection values of the air-fuel ratio sensor on the downstream side of the catalyst 30 as an input variable, and with a value of a storage amount variable which is a variable indicating an oxygen storage amount as an output variable. The evaluation mapping data 76b as the second mapping data may be data defining a neural network that receives integrated values in a predetermined period of an actual fuel amount in excess or deficiency with respect to a fuel amount reacting with oxygen without excess or deficiency and a catalyst temperature and a previous value of the storage amount variable, and outputs the value of the storage amount variable.

In the case, the data to be transmitted from the vehicle to the data analysis center 100 may include, for example, time series data of input data used for calculating the value of the storage amount variable using the evaluation mapping data 76b during the period from the start of the internal combustion engine 10 to the point of time when the mismatch occurs.

(g) State Relating to Presence or Absence of Knocking of Internal Combustion Engine In the case, the practical mapping data 76a as the first mapping data may be data defining mapping that outputs an integrated value of a detection value of a knocking sensor and a logical value indicating whether there is knocking by comparing the magnitude with the determination value. The evaluation mapping data 76b as the second mapping data may be data defining a neural network that receives time series data of the detection value of the knocking sensor and outputs a peak value of the pressure in the combustion chamber 18. In the case, determination may be made that knocking occurs when the peak value is equal to or larger than a threshold value.

In the case, the data to be transmitted from the vehicle to the data analysis center 100 may include, for example, the time series data of the detection value of the knocking sensor used for calculating the peak value when the mismatch occurs and time series data adjacent in time series to the time series data thereof.

(h) State Relating to Temperature of Fuel Supplied to Fuel Injection Valve 20

In the case, the practical mapping data 76a as the first mapping data may be map data with the rotation speed NE, the charging efficiency η, and the coolant temperature THW as input variables and with the fuel temperature as an output variable. The evaluation mapping data 76b as the second mapping data may be data defining a neural network that receives the rotation speed NE, the charging efficiency η, the fuel injection amount by the fuel injection valve 20, an intake temperature, a vehicle speed V, and a previous value of the fuel temperature, and outputs the fuel temperature.

In the case, the data to be transmitted from the vehicle to the data analysis center 100 may include, for example, time series data of input data used for calculating the fuel temperature using the evaluation mapping data 76b during the period from the start of the internal combustion engine 10 to the point of time when the mismatch occurs.

(i) Presence or Absence of Abnormality of Purge System

In the case, in a purge system including a canister that traps fuel vapor in a fuel tank and a purge valve that adjusts a flow path cross-sectional area of a purge path between the canister and the intake passage, mapping is considered in which determination is made that there is an abnormality when the purge path has a hole. In the case, the practical mapping data 76a as the first mapping data may be data defining mapping that outputs a logical value indicating that there is an abnormality when the purge valve is opened to reduce the pressure in the canister and then the pressure increasing speed at the time of closing the purge valve after is equal to or larger than a threshold value. The evaluation mapping data 76b as the second mapping data may be data defining a neural network that receives time series data of the pressure in the canister and an atmospheric pressure and outputs an output value according to the presence or absence of the hole.

In the case, the data to be transmitted from the vehicle to the data analysis center 100 may include, for example, input data used for calculating the output value according to the presence or absence of the hole when the mismatch occurs, and time series data of the pressure in the canister adjacent in time series to the input data or the atmospheric pressure.

(j) EGR Rate

Here, it is assumed that an EGR passage that connects the exhaust passage 28 and the intake passage 12 of the internal combustion engine 10 and an EGR valve that adjusts a flow path cross-sectional area of the EGR passage are provided. An EGR rate is a ratio of a flow rate of a fluid flowing from the EGR passage to the intake passage 12 to a flow rate of a fluid flowing from the intake passage 12 to the combustion chamber 18. In the case, the practical mapping data 76a as the first mapping data may be map data with the rotation speed NE and the charging efficiency η as input variables and the EGR rate as an output variable. The evaluation mapping data 76b as the second mapping data may be data defining a neural network that outputs the EGR rate with the rotation speed NE, the charging efficiency η, the pressure in the intake passage 12, and the intake air amount Ga as input variables.

In the case, the data to be transmitted from the vehicle to the data analysis center 100 may include, for example, input data used for calculating the EGR rate when the mismatch occurs and time series data of input data adjacent in time series to the input data.

(k) State Relating to Presence or Absence of Leakage in Blow-By Gas Delivery Path Here, it is assumed that a blow-by gas delivery path that connects a crankcase and the intake passage of the internal combustion engine is provided. In the case, a pressure sensor is provided in the blow-by gas delivery path, and the practical mapping data 76a as the first mapping may be data for outputting a value indicating the presence or absence of an abnormality based on a magnitude comparison between a pressure detected by the pressure sensor and a determination value based on the rotation speed NE and the charging efficiency η. The evaluation mapping data 76b as the second mapping data may be data defining a neural network that outputs the value indicating the presence or absence of the abnormality with the rotation speed NE, the charging efficiency η, and a difference between the intake air amount Ga and an intake amount passing through the throttle valve 14 as input variables.

In the case, the data to be transmitted from the vehicle to the data analysis center 100 may include, for example, input data used for calculating the value indicating the presence or absence of the abnormality when the mismatch occurs and the time series data of input data adjacent in time series to the input data.

The default state of the vehicle is not limited to the state of the internal combustion engine. For example, as described in a column "About Vehicle" below, the default state of the vehicle may be a state of a battery that stores electric power supplied to a rotating electric machine in a vehicle including the rotating electric machine.

About First Mapping and First Mapping Data

FIG. 1 illustrates the data for executing the processes of S16 and S18 is illustrated as the practical mapping data 76a, but an applicable embodiment of the present disclosure is not limited thereto.

FIG. 6 illustrates the neural network having one intermediate layer as the practical mapping data 76a, but an applicable embodiment of the present disclosure is not limited thereto. For example, there may be a neural network having two or more intermediate layers. The activation function h1 is not limited to the hyperbolic tangent, but may be, for example, a logistic sigmoid function or ReLU. The ReLU is a function that outputs a not smaller one of an input and "0". The number of nodes in the output layer of the neural network, that is, the dimension is not limited to "(number of cylinders)+1". For example, the number of nodes therein may be equal to the number of cylinders, and determination may be made that there is the misfire when any of the output values exceeds a threshold value. Further, for example, there may be one cylinder which is the determination target of the presence or absence of the misfire based on one output of the neural network, and the number of nodes in the output layer may be one. In the case, it is desirable that a range of possible output values of the output layer is standardized by the logistic sigmoid function or the like.

The practical mapping data is not limited to the data defining the neural network. For example, the practical mapping data may be an identification function that outputs numerical values having different signs depending on the presence or absence of the misfire in one cylinder which is the determination target of the misfire. The identification function may be configured, for example, of a support vector machine.

About Second Mapping Data

The evaluation mapping data 76b as the second mapping data is not limited to the data defining the neural network having one intermediate layer. For example, the second mapping data may be data defining a neural network having two or more intermediate layers. The activation function h1 is not limited to the hyperbolic tangent, but may be, for example, the logistic sigmoid function or the ReLU. The number of nodes in the output layer of the neural network, that is, the dimension is not limited to "(number of cylinders)+1". For example, the number of nodes therein may be equal to the number of cylinders, and determination may be made that there is the misfire when any of the output values exceeds a threshold value. Further, for example, there may be one cylinder which is the determination target of the presence or absence of the misfire based on one output of the neural network, and the number of nodes in the output layer may be one. In the case, it is desirable that a range of possible output values of the output layer is standardized by the logistic sigmoid function or the like.

The number of dimensions of the input of the second mapping is not necessarily to be larger than the number of dimensions of the input of the first mapping. For example, there may be second mapping having the same number of dimensions of the input as the first mapping and a larger number of intermediate layers than the first mapping. For example, there may be second mapping having the same number of dimensions of the input and intermediate layers as the first mapping, and the activation functions may be different from each other.

The second mapping is not limited to the neural network. For example, the second mapping may be an identification function that outputs numerical values having different signs depending on the presence or absence of the misfire in one cylinder which is the determination target of the misfire. The identification function may be configured, for example, of a support vector machine.

About Third Mapping and Third Mapping Data

In the above embodiment, the high-specification mapping data 106b having a larger dimension than the input of the mapping defined by the evaluation mapping data 76b and a large number of intermediate layers is exemplified as the third mapping data, but an applicable embodiment of the present disclosure is not limited thereto. For example, the number of dimensions may be the same and the number of intermediate layers may be large. The above can be realized, for example, by setting the number of intermediate layers to be two or more while the same input variables as those exemplified in S42a are set. Further, for example, the number of dimensions may be large and the number of intermediate layers may be the same.

In the above embodiment, the learned model (high-specification mapping data 106b) with the data transmitted from the vehicles VC1, VC2, and the like equipped with the internal combustion engine 10 having one specification as training data is exemplified as the third mapping data, but an applicable embodiment of the present disclosure is not limited thereto. For example, data transmitted from vehicles equipped with various internal combustion engines having different numbers of cylinders, displacements, or the like may be used as training data. However, in the case, it is desirable to use specification information such as the number of cylinders or the displacement as the input variable of the third mapping. The input variable of the third mapping is not limited thereto, but may include, for example, a variable that is not used when the determination by the skilled person is made. Further, the determination result of the skilled person is not necessarily to be used as at least a part of the teacher data when the third mapping data is learned.

About Instantaneous Speed Variable

The instantaneous speed variable is not limited to the minute rotation time, which is the time requested for rotation at a second interval. For example, the instantaneous speed variable may be a value obtained by dividing the second interval by the minute rotation time.

About Second Interval

The second interval defining the instantaneous speed variable which is the input to the mapping is not limited to 30° CA. For example, the angular interval may be smaller than 30° CA such as 10° CA. However, the angular interval is not limited to 30° CA or less, but may be 45° CA or the like.

About Rotation Waveform Variable as Input to Mapping

In the above embodiment, the minute rotation time T30 at each of the divided intervals of the rotation angle of 720° CA, which is one combustion cycle, is input to the mapping, but an applicable embodiment of the present disclosure is not limited thereto. For example, the second intervals may be respectively set to 0 to 20, 40 to 60, 80 to 100, 120 to 140, 160 to 180, . . . , and 700 to 720 among 0 to 720° CA, and times requested for rotation at the intervals may be input to the mapping.

The rotation waveform variable as an input to the mapping is not limited to the time series data of the instantaneous speed variable. For example, the rotation waveform variable may be a difference between a pair of instantaneous speed variables separated by the appearance interval of the compression top dead center.

About Transmission Process (a) Case of Misfire

In the embodiment, the time series data of the minute rotation time T30 for three combustion cycles is transmitted, but an applicable embodiment of the present disclosure is not limited thereto. For example, the data to be transmitted may be time series data for two combustion cycles of the minute rotation times T30(25) to T30(48) when the determination result using the practical mapping data 76a does not match the determination result using the evaluation mapping data 76b and the minute rotation time T30(49) to T30(72) at the time of transition from a state determined to be mismatched to a state determined to be matched.

In the above embodiment, the minute rotation time T30 (49) to T30(72) at the time of transition from the state determined to be mismatched to the state determined to be matched is transmitted in addition to the minute rotation times T30(25) to T30(48) when the determination result using the practical mapping data 76a does not match the determination result using the evaluation mapping data 76b, but an applicable embodiment of the present disclosure is not limited thereto. For example, time series data of the minute rotation time T30 in the state determined to be matched and time series data of the minute rotation time T30 at the time of transition from the state determined to be matched to the state determined to be mismatched may be transmitted.

The time series data of the minute rotation time T30 at the time of transition to the state determined to be matched is not limited to the time series data of one combustion cycle. For example, as described in the column "About Second Mapping Data", in the case where the output value by one input outputs solely the value of the misfire variable of one cylinder or the like and in a case where the input data itself is time series data of the minute rotation time T30 in a shorter period than one combustion cycle, the time series data of the minute rotation time T30 at the time of transition to the state determined to be matched may be time series data of an amount corresponding to the period. However, the time series data of the minute rotation time T30 constituting the input variable to the mapping and the time series data of the minute rotation time T30 at the time of transition to the state determined to be matched are not necessarily to be minute rotation times T30 within a section having the same length.

In the above embodiment, the time series data of the minute rotation time T30 for three combustion cycles corresponding to when the number of times of continuous determination that there is no match is maximum is transmitted once in one trip, but an applicable embodiment of the present disclosure is not limited thereto. For example, all the minute rotation times T30 in the period of continuous determination that there is no match, corresponding to when the number of times of continuous determination that there is no match is maximum, and time series data for one combustion cycle of the minute rotation time T30 at the time of transition from the state determined to be mismatched to the state determined to be matched may be transmitted once in one trip. Further, for example, all the minute rotation times T30 in the period of determination that there is no match and time series data for one combustion cycle of the minute rotation time T30 at the time of transition from the state determined to be mismatched to the state determined to be matched in each of the periods may be transmitted once in one trip.

The data, which is the transmission target, relating to the output value of the mapping defined by the evaluation mapping data 76b is not limited to the output value itself of the mapping. For example, the output value of the mapping defined by the practical mapping data 76a may be used. In the case, for example, when the skilled person determines that the output value of the mapping defined by the practical mapping data 76a is correct in the processes of S92 and S94, affirmative determination may be made in the process of S96. However, even when such data is not transmitted, it is possible for the data analysis center 100 to calculate the output value of the mapping defined by the evaluation mapping data 76b by transmitting the input data.

The input data to the mapping and the data other than the minute rotation time T30 of the data which is the transmission target is not limited to those exemplified in the extra information set GrE. In addition, the input data to the mapping and the data other than the minute rotation time T30 are not necessarily to be the transmission targets.

The data, which is the transmission target, based on the minute rotation times T30 used when the input data to the mapping defined by the evaluation mapping data 76b is generated is not limited to the input data itself. For example, even when the input data to the mapping defined by the evaluation mapping data 76b is the minute rotation times T30[0] and T30[6] used in the process of S16, the data which is the transmission target may be the minute rotation time T30(1) to T30(24).

(b) Other

On condition that determination is made that there is no match, an applicable embodiment of the present disclosure is not limited to the process of transmitting the input data or the like. For example, the data used as the input of the evaluation mapping data 76b or the like may be transmitted each time the output value of the evaluation mapping data 76b is calculated. Therefore, it is possible to verify whether the output value of the mapping in various situations is correct outside the vehicle.

Further, the data which is the transmission target is not limited to the data exemplified in the column "About Default State of Vehicle" in the embodiments other than the misfire.

About Determination Process

The verification period of the process of S60 is not limited to the exemplification in the above embodiment.

In the processes in FIGS. 4 and 9, the determination is made whether the misfire determination result based on the practical mapping data 76a and the misfire determination result based on the evaluation mapping data 76b match or mismatch solely for the verification period. However, an applicable embodiment of the present disclosure is not limited thereto and, for example, the determination may be made all the time.

In the above embodiment, the determination is made whether the misfire determination results based on the sensor detection values acquired in the same period matches. However, the matching between the output of the first mapping and the output of the second mapping with the data based on the sensor detection values acquired in the same period as the inputs is not necessarily to be determined depending on the selection of the mapping data. For example, as described in the column "About Default State of Vehicle", in the case of the mapping that outputs the value of the deterioration variable of the catalyst or the air-fuel ratio sensor and in the case where the active control is assumed solely for the first mapping, the presence or absence of the matching therebetween may be determined based on the values calculated within the same trip.

As described in the column "About Default State of Vehicle", in the case of the mapping or the like that outputs the value of the deterioration variable of the catalyst 30 or the air-fuel ratio sensor, determination may be made that there is no match when an absolute value of a difference between the output value of the first mapping and the output value of the second mapping is equal to or larger than a predetermined value.

About Relearned Parameter

In FIGS. 4 and 9, the relearned parameters, which are updated parameters, are transmitted to each of the vehicles VC1, VC2, and the like through the network 110, but an applicable embodiment of the present disclosure is not limited thereto. For example, the data may be transmitted to a vehicle dealer and the data in the storage device 76 may be updated when each of the vehicles VC1, VC2, and the like is carried in the vehicle dealer. Even in such a case, it is possible to further evaluate and update the reliability of the evaluation mapping data 76b updated by the relearned parameters.

However, the relearned parameters are not necessarily to be provided to the vehicle that provides the data used for the relearning. The evaluation mapping data 76b may be updated using the relearned parameters, and the updated evaluation mapping data 76b may simply be mounted on a newly developed vehicle. In such a case, it is desirable that a difference between a displacement of the internal combustion engine mounted on the newly developed vehicle and a displacement of the internal combustion engine mounted on the vehicle that transmits the data for relearning is equal to or less than a predetermined displacement. In the case where the evaluation mapping data is to output the misfire variable according to the probability that the misfire occurs in each cylinder as in the above embodiment, it is desirable that the number of cylinders of the internal combustion engine mounted on the newly developed vehicle is the same as the number of cylinders of the internal combustion engine mounted on the vehicle that transmits the data for relearning.

Further, in the processes in FIGS. 4 and 9, the evaluation mapping data 76b may be updated using the relearned parameters and then the practical mapping data 76a may be overwritten by the updated evaluation mapping data 76b.

About Display Device

In the above embodiment, the display device 112 is disposed in the data analysis center 100. However, an applicable embodiment of the present disclosure is not limited thereto, and the display device 112 may be disposed in a site different from a site where the storage device 106 and the like are disposed.

About Relearning Data Generation Process

In FIG. 4, the skilled person evaluates whether the erroneous determination is made by displaying the input data used for calculating the misfire variables P(j) and Pn(j) calculated using the evaluation mapping data 76b and the related data on the display device 112, but an applicable embodiment of the present disclosure is not limited thereto. For example, the evaluation may be performed automatically using the high-specification mapping data 106b. When the misfire variables P(j) and Pn(j) calculated using the evaluation mapping data 76b are evaluated, data other than the input data used for calculating the misfire variables P(j) and Pn(j) is not necessarily to be further added for the evaluation.

In FIG. 9, whether the erroneous determination is made is automatically evaluated using the high-specification mapping data 106b based on the input data used for calculating the misfire variable Pn(j) calculated using the evaluation mapping data 76b and the related data. However, an applicable embodiment of the present disclosure is not limited thereto and, for example, the skilled person may perform the evaluation.

In the process in FIG. 4, the process of S92 is executed each time the process of S80 is executed for convenience of description, but an applicable embodiment of the present disclosure is not limited thereto. For example, the process of S92 may be executed at a point of time when a predetermined amount of data determined to be mismatched is accumulated. Further, for example, the data determined to be mismatched may be accumulated each time, and the process of S92 may be executed in response to a request from the skilled person.

In the above embodiment, the validity of the determination result of the mapping defined by the evaluation mapping data 76b is determined by using a subject having higher accuracy than the mapping defined by the evaluation mapping data 76b or the practical mapping data 76a, but an applicable embodiment of the present disclosure is not limited thereto. For example, the validity of the determination result of the mapping defined by the evaluation mapping data 76b may be determined by a majority decision between the determination result defined by the evaluation mapping data 76b and the determination result by two or more other pieces of mapping. Further, for example, one of the determination results based on the two or more other pieces of mapping may be determined by the skilled person instead of the determination result based on the mapping.

About Responding Process

In the above embodiment, the process of operating the warning light 90 mounted on the vehicle is exemplified as the notification process, but an applicable embodiment of the present disclosure is not limited thereto. For example, the notification process may be a process of operating the communication device 77 to display information indicating that an abnormality occurs on a portable terminal of the user.

The responding process is not limited to the notification process. For example, the responding process may be a process of operating an operation unit that controls the combustion of the air-fuel mixture in the combustion chamber 18 of the internal combustion engine 10 in accordance with information indicating that the misfire occurs. For example, as described in the column "About Default State of Vehicle", in the case of the mapping that outputs the determination result of the presence or absence of the imbalance abnormality, the responding process may be a process of operating the fuel injection valve such that the imbalance abnormality is suppressed. Further, for example, as described in the column "About Default State of Vehicle", in the case of the mapping that outputs the catalyst temperature, the responding process may be a process of operating an operation unit of the internal combustion engine to increase the catalyst temperature. The operation process in the case may be, for example, a catalyst regeneration process.

About Vehicle Learning Control System

In the above embodiment, the vehicle learning control system is configured of the control device 70 and the data analysis center 100, but an applicable embodiment of the present disclosure is not limited thereto. For example, the vehicle learning control system may be configured of the portable terminal in addition to the control device 70 and the data analysis center 100. The system can be realized, for example, by executing the process in FIG. 3 by the portable terminal and transmitting the result to the control device 70 in the first embodiment.

About Vehicle Learning Device

A vehicle learning device may be configured using the portable terminal instead of the data analysis center 100. The device can be realized, for example, by storing the high-specification mapping data 106b or the like in a storage device of the portable terminal and executing the process on the right side of FIG. 9B by the portable terminal. In the case, solely the data relating to the vehicle VC1 may be transmitted to the portable terminal of the user of the vehicle VC1.

About Execution Device

The execution device includes the CPU 72 (102) and the ROM 74 (104), and is not limited to a device that executes a software process. For example, the execution device may include a dedicated hardware circuit (for example, an ASIC or the like) that performs a hardware process for at least a part of the software process in the above embodiment. That is, the execution device may have any one of the following configurations (a) to (c). (a) A process device that executes all the above processes according to a program and a program storage device such as a ROM that stores the program are provided. (b) A process device that executes a part of the above processes according to a program, a program storage device, and a dedicated hardware circuit that executes the remaining processes are provided. (c) A dedicated hardware circuit that executes all the above processes is provided. Here, there may be a plurality of software execution devices including the process device and the program storage device, or a plurality of dedicated hardware circuits.

About Storage Device

In the above embodiment, the storage device 76 that stores the evaluation mapping data 76b and the practical mapping data 76a and the ROM 74 which is a storage device that stores the relearning subprogram 74b are different storage devices, but an applicable embodiment of the present disclosure is not limited thereto. Further, for example, the storage device 106 that stores the high-specification mapping data 106b and the ROM 104 which is a storage device that stores the relearning main program 104a are different storage devices, but an applicable embodiment of the present disclosure is not limited thereto.

About Internal Combustion Engine

In the above embodiment, an in-cylinder injection valve that injects fuel into the combustion chamber 18 is exemplified as the fuel injection valve, but an applicable embodiment of the present disclosure is not limited thereto. For example, the fuel injection valve may be a port injection valve that injects fuel into the intake passage 12. Further, for example, both the port injection valve and the in-cylinder injection valve may be provided.

The internal combustion engine is not limited to a spark ignition type internal combustion engine, but may be a compression ignition type internal combustion engine using light oil or the like as fuel, or the like. The internal combustion engine is not necessarily to be configured of a drive system. For example, there may be an internal combustion engine mounted on a so-called series hybrid vehicle in which the crankshaft is mechanically connected to an on-vehicle generator and power transmission is cut off from the drive wheels 60.

About Vehicle

The vehicle is not limited to a vehicle in which a device that generates propulsion force of the vehicle is solely an internal combustion engine. For example, the vehicle may be a parallel hybrid vehicle or a series-parallel hybrid vehicle in addition to the series hybrid vehicle described in the column "About Internal Combustion Engine". Further, the vehicle may be an electric vehicle on which an internal combustion engine is not mounted.

Other

A drive system device interposed between the crankshaft and the drive wheels is not limited to a stepped transmission, but may be, for example, a continuously variable transmission.

What is claimed is:

1. A vehicle control device comprising:
a storage device configured to store mapping data including data that defines mapping that receives input data based on a plurality of detection values which are detection values of an in-vehicle sensor and which are before or after in time series and outputs a predetermined output value having information on a default state of a vehicle and that is learned by machine learning; and
an execution device configured to execute an acquisition process of acquiring the input data from the storage device, a calculation process of calculating the predetermined output value with the input data acquired by the acquisition process as an input of the mapping, and a transmission process of transmitting time series data including data based on the detection values used when the input data is generated and one or a plurality of detection values which are before or after the detection value used for the input data in time series to an outside of the vehicle.

2. The vehicle control device according to claim 1, wherein:
the storage device is configured to store first mapping data which is data defining first mapping that receives first input data based on the detection value of the in-vehicle sensor and outputs a first output value which is an output value having the information on the default state and second mapping data which is data defining second mapping that receives second input data based on the detection value of the in-vehicle sensor and outputs a second output value which is an output value having the information on the default state;
the execution device is configured to execute a first acquisition process of acquiring the first input data based on the detection value of the in-vehicle sensor, a first calculation process of calculating a first output value with the first input data acquired by the first acquisition process as an input of the first mapping, a second acquisition process of acquiring the second input data based on the detection value of the in-vehicle sensor, a second calculation process of calculating the second output value with the second input data acquired by the second acquisition process as an input of the second mapping, and a determination process of determining whether the first output value matches the second output value; and
the execution device is configured to execute the transmission process when determination is made by the determination process that there is no match.

3. The vehicle control device according to claim 2, wherein:
the in-vehicle sensor is a crank angle sensor of an internal combustion engine mounted on the vehicle;
the first input data and the second input data are rotation waveform variables which are variables including information on a difference between values of an instantaneous speed, which is a rotation speed of a crankshaft of the internal combustion engine at an angular interval smaller than an appearance interval of a compression top dead center of the internal combustion engine, at different angular intervals; and
the time series data includes an instantaneous speed variable which is a variable indicating the instantaneous speed in each of the angular interval that includes the information on the difference between the instantaneous speeds indicated by the rotation waveform variable used for calculating the second output value when determination is made by the determination process that there is no match and the angular interval that is generated before or after the angular interval in time series.

4. The vehicle control device according to claim 3, wherein:
the angular interval is a second interval;
the rotation waveform variable is time series data configured as a variable indicating a difference between the instantaneous speed variables by the instantaneous speed variable itself in each of a plurality of continuous second intervals included in a first interval larger than the second interval; and
the time series data transmitted by the transmission process includes the instantaneous speed variable in each of the continuous second intervals adjacent to the first interval in addition to the instantaneous speed variable in each of the second intervals when determination is made by the determination process that there is no match.

5. The vehicle control device according to claim 3, wherein:
both the first output value and the second output value are output values relating to presence or absence of a misfire; and
the time series data transmitted by the transmission process includes the instantaneous speed variable relating to the rotation waveform variable used for calculating the second output value when determination is made by the determination process that there is no match and the instantaneous speed variable when determination is made by the determination process that there is a match.

6. The vehicle control device according to claim 4, wherein:
both the first output value and the second output value are output values relating to presence or absence of a misfire; and
the time series data transmitted by the transmission process includes the instantaneous speed variable relating to the rotation waveform variable used for calculating the second output value when determination is made by the determination process that there is no match and the instantaneous speed variable when determination is made by the determination process that there is a match.

7. The vehicle control device according to claim 5, wherein the time series data transmitted by the transmission process includes the instantaneous speed variable when determination is made by the determination process that there is no match and the instantaneous speed variable in a state determined to be matched at a time of transition from a state determined to be mismatched to the state determined to be matched by the determination process.

8. The vehicle control device according to claim 6, wherein the time series data transmitted by the transmission process includes the instantaneous speed variable when determination is made by the determination process that there is no match and the instantaneous speed variable in a state determined to be matched at a time of transition from a state determined to be mismatched to the state determined to be matched by the determination process.

9. The vehicle control device according to claim 1, wherein the execution device is configured to execute the transmission process at an end of traveling of the vehicle.

10. The vehicle control device according to claim 2, wherein the execution device is configured to execute the transmission process at an end of traveling of the vehicle.

11. The vehicle control device according to claim 3, wherein the execution device is configured to execute the transmission process at an end of traveling of the vehicle.

12. The vehicle control device according to claim 4, wherein the execution device is configured to execute the transmission process at an end of traveling of the vehicle.

13. The vehicle control device according to claim 5, wherein the execution device is configured to execute the transmission process at an end of traveling of the vehicle.

14. The vehicle control device according to claim 7, wherein the execution device is configured to execute the transmission process at an end of traveling of the vehicle.

15. A vehicle learning control system comprising:
a first storage device configured to store mapping data including data that defines mapping that receives input data based on a plurality of detection values which are detection values of an in-vehicle sensor and which are before or after in time series and outputs a predetermined output value having information on a default state of a vehicle and that is learned by machine learning;
a first execution device mounted on a vehicle, the first execution device being configured to execute an acquisition process of acquiring the input data from the first storage device, a calculation process of calculating the predetermined output value with the input data acquired by the acquisition process as an input of the mapping, and a transmission process of transmitting time series data including data based on the detection values used when the input data is generated and one or a plurality of detection values which are before or after the detection value used for the input data in time series to an outside of the vehicle; and
a second execution device outside the vehicle, the second execution device being configured to execute a reception process of receiving the time series data transmitted from the first execution device by the transmission process, a relearning data generation process of generating relearning data that is data for relearning the mapping based on the time series data received by the reception process, and a relearning process of relearning the mapping data based on the data generated by the relearning data generation process.

16. The vehicle learning control system according to claim 15, wherein the relearning data generation process includes a display process of displaying the time series data transmitted by the transmission process on a display device, a validity determination result taking-in process of taking in information on whether there is an error in an output value of the mapping, and a process of generating data for updating the mapping data based on the information input by the validity determination result taking-in process.

17. The vehicle learning control system according to claim 15, further comprising a second storage device outside the vehicle, wherein:
the first storage device is mounted on the vehicle;
the second storage device is configured to store third mapping data defining third mapping that receives data based on the detection value of the in-vehicle sensor and outputs a third output value having the information on the default state; and
the relearning data generation process includes a third calculation process of inputting the time series data transmitted by the transmission process to the third mapping to calculate the third output value and a process of generating data for updating the mapping data based on presence or absence of matching between a calculation result of the third calculation process and a calculation result of the calculation process.

18. The vehicle learning control system according to claim 15, wherein the second execution device is configured to execute a parameter transmission process of transmitting a relearned parameter learned by the relearning process to the vehicle, and the first execution device is configured to execute a parameter reception process of receiving the parameter transmitted by the parameter transmission process.

19. A vehicle control device comprising an execution device mounted on a vehicle, the execution device being configured to execute an acquisition process of acquiring input data based on a plurality of detection values which are detection values of an in-vehicle sensor and which are before or after in time series, a calculation process of calculating a predetermined output value with the input data acquired by the acquisition process as an input of mapping, and a transmission process of transmitting time series data including data based on the detection values used when the input data is generated and one or a plurality of detection values which are before or after the detection value used for the input data in time series to an outside of the vehicle.

20. A vehicle learning device comprising an execution device outside a vehicle, the execution device being configured to execute a reception process of receiving time series data from the vehicle, a relearning data generation process of generating relearning data that is data for relearning mapping based on the time series data received by the reception process, and a relearning process of relearning the mapping data based on the data generated by the relearning data generation process.

* * * * *